United States Patent
De Rocher et al.

(10) Patent No.: US 7,652,816 B2
(45) Date of Patent: Jan. 26, 2010

(54) METHOD FOR NETWORK COMMISSIONING AND UPGRADING USING AMPLIFIED SPONTANEOUS EMISSION (ASE) SOURCES

(75) Inventors: Jason Christopher De Rocher, Ottawa (CA); Hamish Iain MacDonald, Kanata (CA); Walter Joseph Carpini, Stittsville (CA); Eddie Kai Ho Ng, Markham (CA); Derrick Remedios, Ottawa (CA); James Benson Bacque, Ottawa (CA); Ping Wai Wan, Kanata (CA)

(73) Assignee: Alcatel Lucent, Paris (FR)

( * ) Notice: Subject to any disclaimer, the term of this patent is extended or adjusted under 35 U.S.C. 154(b) by 271 days.

(21) Appl. No.: 11/615,953

(22) Filed: Dec. 23, 2006

(65) Prior Publication Data
US 2007/0201126 A1 Aug. 30, 2007

(51) Int. Cl.
*H01S 4/00* (2006.01)
*H04B 10/12* (2006.01)
(52) U.S. Cl. ............................. 359/333; 398/21; 398/25; 398/37
(58) Field of Classification Search ................... 359/333; 398/21, 25, 37, 27
See application file for complete search history.

(56) References Cited

U.S. PATENT DOCUMENTS 6,400,479 B1 * 6/2002 Zhou et al. ................ 398/92
2003/0133713 A1 * 7/2003 Ng et al. .................... 398/37
2004/0100684 A1 * 5/2004 Jones et al. ............ 359/337.11
2004/0240040 A1 * 12/2004 Tian et al. .................. 359/337
2004/0247319 A1 * 12/2004 Melman ...................... 398/65
2005/0047781 A1 * 3/2005 El-Reedy et al. .............. 398/37

* cited by examiner

*Primary Examiner*—Eric Bolda
(74) *Attorney, Agent, or Firm*—IP-MEX Inc.; Victoria Donnelly

(57) ABSTRACT

This invention provides a method for commissioning and upgrading an optical ring network using its internal amplifiers as Automatic Spontaneous Emission sources of light that are used in making measurements. A modular segmented approach is adopted and the network is commissioned segment by segment. A flexible method is used for upgrading a commissioned network by adding or deleting a node or changing the internal configuration of a node. The method uses techniques for the correction of the Optical Signal to Noise Ratio induced error as well as the Spectral Filtering Error during the loss computation required for adjusting the gains of the amplifiers at each network node to an appropriate value. Since the method does not require an external laser source that needs to be moved manually from node to node it greatly reduces the commissioning time. Since it uses only the components of the network itself and does not deploy any additional device it also leads to a significant saving in cost.

35 Claims, 20 Drawing Sheets

METHOD FOR NETWORK COMMISSIONING AND UPGRADING USING AMPLIFIED SPONTANEOUS EMISSION (ASE) SOURCES

FIELD OF INVENTION

The invention relates to optical communication networks, and in particular to a method for commissioning and upgrading an optical network using Amplified Spontaneous Emission (ASE) sources.

BACKGROUND OF INVENTION

Managing an optical network involves both network commissioning and upgrading. Commissioning an optical network is an important step in making the network ready for use after its installation is complete. Network commissioning concerns the deployment of network nodes for making them operational and includes the adjustment of various operational parameters in the node and testing to ascertain that the deployed network meets its specifications. Moreover, the capability to upgrade an existing network, through addition and deletion of nodes as well as through making changes in the configuration of an existing node are often necessary after the network has been commissioned. A node in an optical network contains a number of components such as amplifiers, blockers and attenuators. Fixing the operational parameters for the different components such as amplifier gains that are estimated during the link planning stage is a major objective for network commissioning and upgrading. Using an optical signal source at various nodes in the network and making measurements at the output of various components are required to achieve this objective. A removable laser source is typically used in prior art for this purpose. The laser source is attached to a particular node and the resulting signals are then measured at various points in the network. For completing the network installation, however, the laser source needs to be attached to various nodes in the network. One of the major problems with this approach is that the laser source is to be moved manually from one node to another leading to long network commissioning times. Another problem is that, additional hardware is needed, giving rise to extra costs, and additional logistics problems. Thus there is a need in the field for the development of an improved and efficient method for commissioning and upgrading of an optical network.

SUMMARY OF THE INVENTION

A method for managing an optical network including nodes, the method comprising one or more of the following steps: commissioning an optical network by using an internal Amplified Spontaneous Emission (ASE) light inherently present in the optical network as a light source (the ASE light source) for measuring losses inside and between the nodes; and upgrading an optical network by using the ASE light source for measuring losses inside and between the nodes. The step of commissioning the optical network comprises commissioning a path of the optical network with a plurality of nodes, the method comprising steps of: verifying a node installation using the internal ASE light source for measuring losses inside the node; preparing for node commissioning; commissioning nodes using the internal ASE light source for measuring losses inside and between the nodes. The step of commissioning the path of the optical network further comprises the step of: checking commissioning of nodes. The optical network includes segments, each segment including two adjacent nodes in said optical network and each node includes a demultiplexer, an ingress amplifier, an egress amplifier, a blocker, a coupler and a multiplexer.

The step of upgrading the optical network comprises one or more of the following steps: adding a new node; deleting a node; and changing the internal configuration of a node. The step of adding the new node further comprises the steps of: installing hardware for the new node; connecting fiber between the new node and a preceding node; connecting fiber between the new node and a following node; commissioning affected network segments; wherein the preceding node is the node that immediately precedes the new node, the following node is the node that immediately follows the new node in the optical network and the affected network segments are segments associated with the new node requiring commissioning. The step of commissioning the affected network segments further comprises the steps of: commissioning a preceding segment; commissioning a following segment; wherein the preceding segment includes the new node, the preceding node and the fiber connecting the preceding node with the new node and the following segment includes the new node, the following node and the fiber connecting the new node with the following node. The step of commissioning the preceding segment further comprises the steps of: setting the ingress amplifier of the preceding node to constant power mode for making the ingress amplifier the ASE light source; setting all channels in the blocker in the preceding node to pass-through; adjusting gain of the egress amplifier on the preceding node; adjusting gain of the ingress amplifier on the new node; setting the ingress amplifier on the preceding node to constant gain mode; and setting all channels in the blocker in the preceding node to block. The step of commissioning the following segment further comprises the steps of: setting the ingress amplifier of the new node to constant power mode for making the said ingress amplifier the ASE light source; setting all channels in the blocker in the new node to pass-through; adjusting gain of the egress amplifier on the new node; adjusting gain of the ingress amplifier on the following node; setting the ingress amplifier on the new node to constant gain mode; and setting all channels in the blocker in the new node to block. The step of deleting the node comprises the steps of: disconnecting fiber between a deleted node and a preceding node; disconnecting fiber between the deleted node and a following node; connecting fiber between the preceding node and the following node; and commissioning an affected network segment; wherein the preceding node is the node that immediately precedes the deleted node and the following node is the node that immediately follows the deleted node in the optical network and the affected network segment includes the preceding node, the following node and the fiber connecting the preceding node with the following node. The step of commissioning the affected network segment further comprises the steps of: setting the ingress amplifier of the preceding node to constant power mode for making the said ingress amplifier the ASE light source; setting all channels in the blocker in the preceding node to pass-through; adjusting gain of the egress amplifier on the preceding node; adjusting gain of the ingress amplifier on the following node; setting the ingress amplifier on the preceding node to constant gain mode; and setting all channels in the blocker in the preceding node to block. The step of changing the internal configuration of a node further comprises the steps of: making hardware changes in a changed node; and commissioning affected network segments; wherein the affected network segments are segments associated with the changed node requiring commissioning. The step of commissioning the affected network segments further comprises the steps of:

commissioning a preceding segment; commissioning a following segment; wherein the preceding segment includes the preceding node that immediately precedes the changed node in the optical network, the changed node and the fiber connecting the preceding node with the changed node and the following segment includes the changed node, a following node that immediately follows the changed node in the optical network and the fiber connecting the changed node with the following node. The step of commissioning the preceding segment further comprises the steps of: setting the ingress amplifier of the preceding node to constant power mode for making the said ingress amplifier the ASE light source; setting all channels in the blocker in the preceding node to pass-through; adjusting gain of the egress amplifier on the preceding node; adjusting gain of the ingress amplifier on the changed node; setting the ingress amplifier on the preceding node to constant gain mode; and setting all channels in the blocker in the preceding node to block. The step of commissioning the following segment further comprises the steps of: setting the ingress amplifier of changed node to constant power mode for making the said ingress amplifier the ASE light source; setting all channels in the blocker in changed node to pass-through; adjusting gain of the egress amplifier on the changed node; adjusting gain of the ingress amplifier on the following node; setting the ingress amplifier on the changed node to constant gain mode; and setting all channels in the blocker in the changed node to block. The step of adjusting the gain of the egress amplifier on the preceding node further comprises the step of measuring associated losses and setting the gain of the egress amplifier on the preceding node to a value that compensates for these losses. The step of adjusting the gain of the ingress amplifier on the new node further comprises the step of measuring associated losses and setting the gain of the ingress amplifier on the new node to a value that compensates for these losses. The step of adjusting the gain of the egress amplifier on the new node further comprises the step of measuring associated losses and setting the gain of the egress amplifier on the new node to a value that compensates for these losses. The step of adjusting the gain of the ingress amplifier on the following node further comprises the step of measuring associated losses and setting the gain of the ingress amplifier on the following node to a value that compensates for these losses. The step of adjusting the gain of the egress amplifier on the preceding node further comprises the step of measuring associated losses and setting the gain of the egress amplifier on the preceding node to a value that compensates for these losses. The step of adjusting the gain of the ingress amplifier on the following node further comprises the step of measuring associated losses and setting the gain of the ingress amplifier on the following node to a value that compensates for these losses. The step of adjusting the gain of the egress amplifier on the preceding node further comprises the step of measuring associated losses and setting the gain of the egress amplifier on the preceding node to a value that compensates for these losses. The step of adjusting the gain of the ingress amplifier on the changed node further comprises the step of measuring associated losses and setting the gain of the ingress amplifier on the changed node to a value that compensates for these losses. The step of adjusting the gain of the egress amplifier on the changed node further comprises the step of measuring associated losses and setting the gain of the egress amplifier on the changed node to a value that compensates for these losses. The step of adjusting the gain of the ingress amplifier on the following node further comprises the step of measuring associated losses and setting the gain of the ingress amplifier on the following node to a value that compensates for these losses.

The step of measuring associated losses and setting the gain of the egress amplifier on the preceding node further comprises the step of correcting the OSNR induced error as well as the Spectral Filtering error. The step of measuring associated losses and setting the gain of the ingress amplifier on the new node further comprises the step of correcting the OSNR induced error as well as the Spectral Filtering error. The step of measuring associated losses and setting the gain of the egress amplifier on the new node further comprises the step of correcting the OSNR induced error as well as the Spectral Filtering error. The step of measuring associated losses and setting the gain of the ingress amplifier on the following node further comprises the step of correcting the OSNR induced error as well as the Spectral Filtering error. The step of measuring associated losses and setting the gain of the egress amplifier on the preceding node further comprises the step of correcting the OSNR induced error as well as the Spectral Filtering error. The step of measuring associated losses and setting the gain of the ingress amplifier on the following node further comprises the step of correcting the OSNR induced error as well as the Spectral Filtering error. The step of measuring associated losses and setting the gain of the egress amplifier on the preceding node further comprises the step of correcting the OSNR induced error as well as the Spectral Filtering error. The step of measuring associated losses and setting the gain of the ingress amplifier on the changed node further comprises the step of correcting the OSNR induced error as well as the Spectral Filtering error. The step of measuring associated losses and setting the gain of the egress amplifier on the changed node further comprises the step of correcting the OSNR induced error as well as the Spectral Filtering error. The step of measuring associated losses and setting the gain of the ingress amplifier on the following node further comprises the step of correcting the OSNR induced error as well as the Spectral Filtering error. The optical network is a ring optical network.

BRIEF DESCRIPTION OF THE DRAWINGS

Further features and advantages of the invention will be apparent from the following description of the embodiment, which is described by way of example only and with reference to the accompanying drawings in which:

FIG. 14 B presents a flowchart for explaining the step of commissioning the following segment after a new node is added;

DETAILED DESCRIPTION OF THE EMBODIMENT OF THE INVENTION

By way of example, the embodiment of the invention illustrates the commissioning and upgrading of the through-path in an optical ring network and is described in this section.

Figure 1:
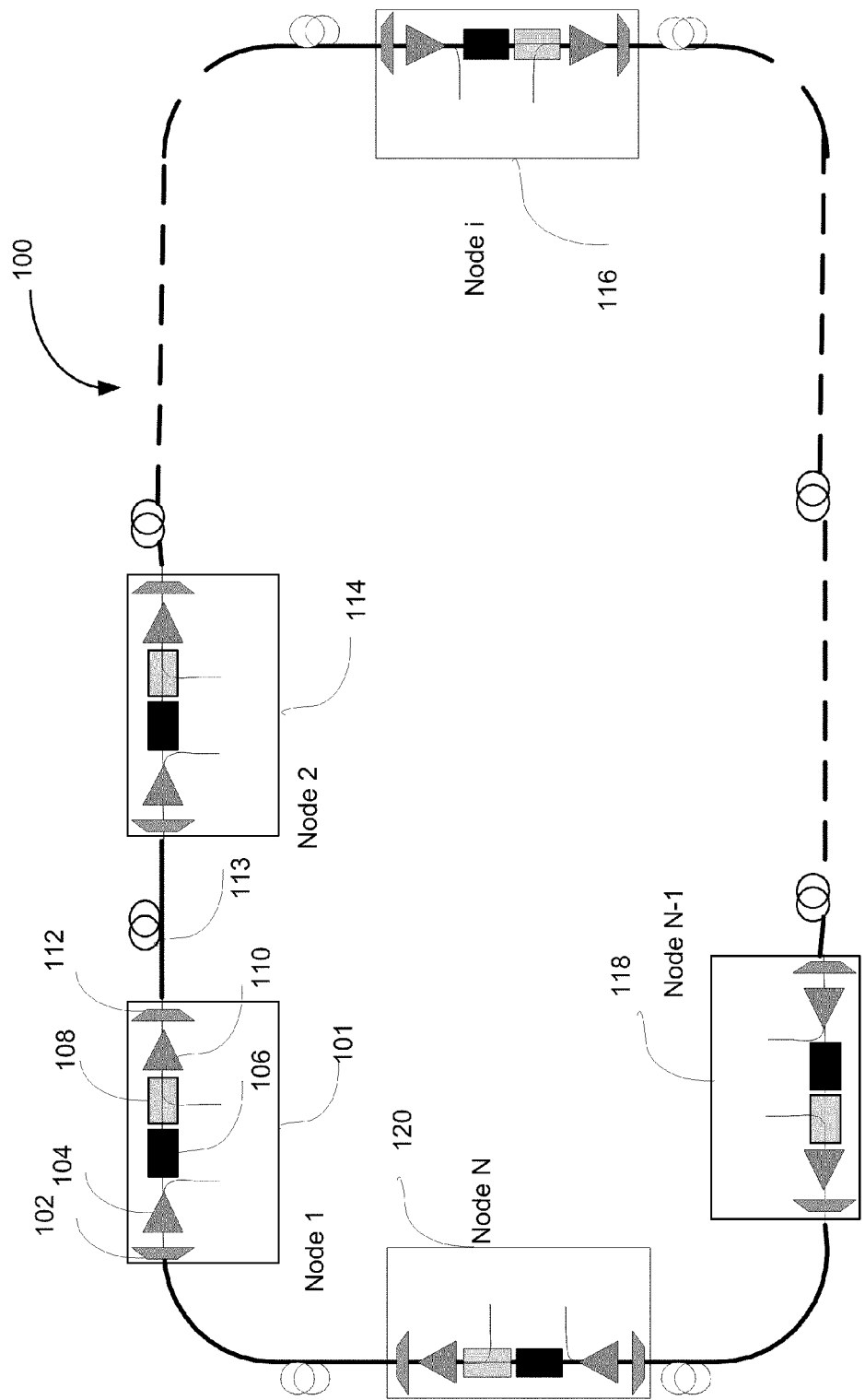
FIG. 1 presents a ring optical network with N nodes.

An example optical ring network 100 with N nodes is presented in FIG. 1. The figure displays Node 1, 101, Node 2 114, Node i 116, Node N−1 118, and Node N 120 that are organized in the form of a ring. Each node has a number of optical components. Node 1 for example, has a demultiplexer 102, an ingress amplifier 104, a blocker 106, a coupler 108, an egress amplifier 110 and a multiplexer 112. The input for the node arrives at the input of the demultiplexer 102. The blocker 106 may be achieved by an appropriately configured Reconfigurable Optical Add Drop Multiplexer (ROADM). The output of the demultiplexer 102 is connected to the input of the ingress amplifier 104, the output of which is connected to the input of the blocker 106. The output of the blocker 106 is connected to the input of the coupler 108, the output of which is connected to the input of the egress amplifier 110. The output of the egress amplifier 110 is connected to the input of the multiplexer 112 the output of which is connected to a network span 113 that carries the output optical signal from Node 1 (101) to the input of the next node, Node 2 (114). The output optical signal from any Node i ($2 \leq i < N$) 116 is carried through a network to the input of Node i+1. In order to maintain a ring configuration, the output of Node N 120 is connected by a network span to the input of Node 1 101.

One of the important attributes of the invention is to avoid the need of the external laser source traditionally used in prior art for commissioning optical networks. This is achieved by operating the ingress amplifier of a given node in the constant power mode and using the noise generated due to automatic spontaneous emission (ASE) light inherently present in the optical network as a light source (the ASE light source) to replace the external laser source used in prior art during node commissioning for measuring losses inside and between the nodes in the network. Computation of the losses introduced by the network and setting the gains of the amplifiers in the nodes appropriately for offsetting these losses are performed during the node commissioning. Two types of errors need to be considered during loss computations: Optical Signal to Noise Ratio (OSNR) induced error and Spectral Filtering Error. Each of these as well as the correction mechanisms employed by the invention are briefly described.

Additional ASE noise from intermediate constant gain mode amplifiers gives rise to the OSNR induced error. The error and the mechanism used for its correction are explained with the help of FIG. 2 (200) that presents a sequence of amplifiers $A_1$ 202, $A_2$ 204 and $A_3$ 206. The input and output signal associated with an amplifier $A_i$ ($1 \leq i \leq 3$) are designated by $Pin_i$ and $Pout_i$ respectively. The output of an amplifier is connected to the input of the next amplifier in the sequence. $L_0$ is the loss incurred by the signal $P_0$ when it arrives at the input of $A_1$ 202. Similarly $L_1$ is the loss incurred by $Pout_1$ when it arrives at the input of $A_2$ 204 and $L_2$ is the loss incurred by $Pout_2$ when it arrives at the input of $A_3$ 206. If the amplifiers were ideal amplifiers and did not induce any noise $L_0$ could be computed as:

$$L_0 = P_0 - (Pout_1 - G_1)$$

where $G_1$ is the gain of amplifier $A_1$ 202.

However, with a real optical amplifier such as $A_1$ that gives rise to noise during amplification:

$$Pout_1 = Pin_1 + G_1 + N_1$$

where $N_1$ is the noise induced by $A_1$ 202.

In order to obtain the correct value of $L_0$, the invention uses the Psig signal provided by the amplifier. In response to a query sent to $A_1$ for example, the power reading $Psig_1$ is provided by the amplifier. $Psig_1$ is the power at the amplifier without the added noise. The correct value of $L_0$ is thus obtained as:

$$L_0 = P_0 - (Psig_1 - G_1)$$

Figure 2:
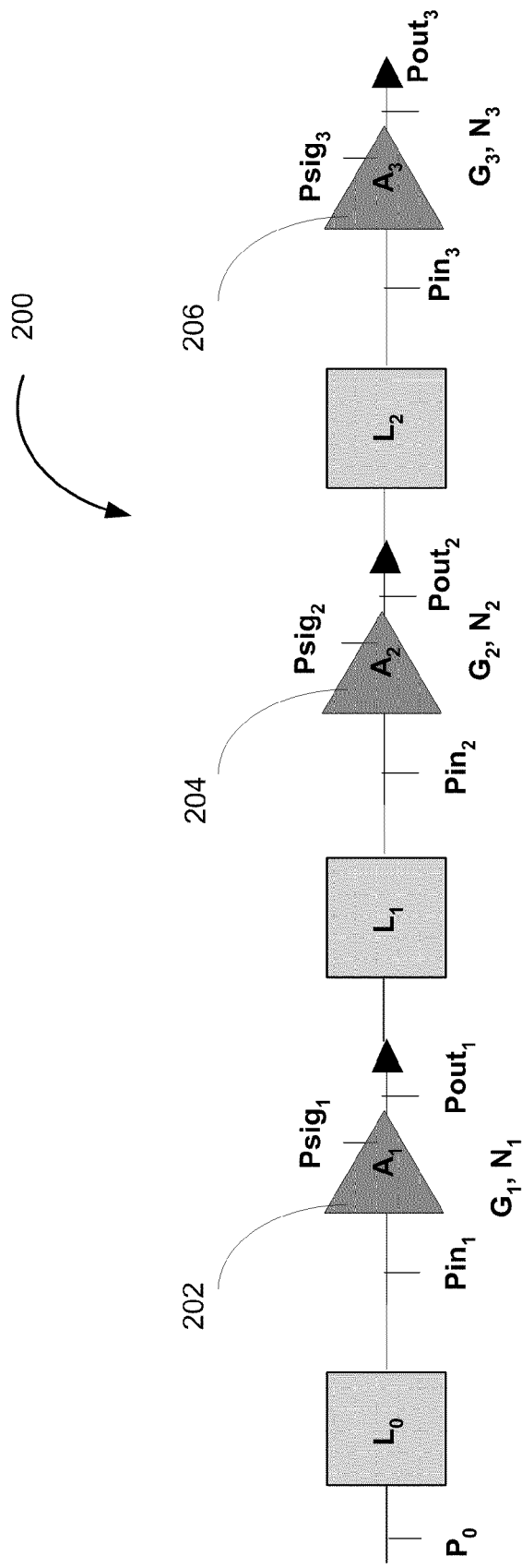
FIG. 2 displays a sequence of three amplifiers for illustrating errors to be considered during loss computations in the network of FIG. 2.

Similarly the correct values of $L_1$ and $L_2$ in FIG. 2 are computed in the current invention by using the $Psig_2$ value for $A_2$ 204 and the $Psig_3$ value for $A_3$ 206 respectively:

$$L_1 = Pout_1 - (Psig_2 - G_2)$$

$$L_2 = Pout_2 - (Psig_3 - G_3)$$

where $G_2$ and $G_3$ are the gains of amplifier $A_2$ 204 and $A_3$ 206 respectively.

Figure 3:
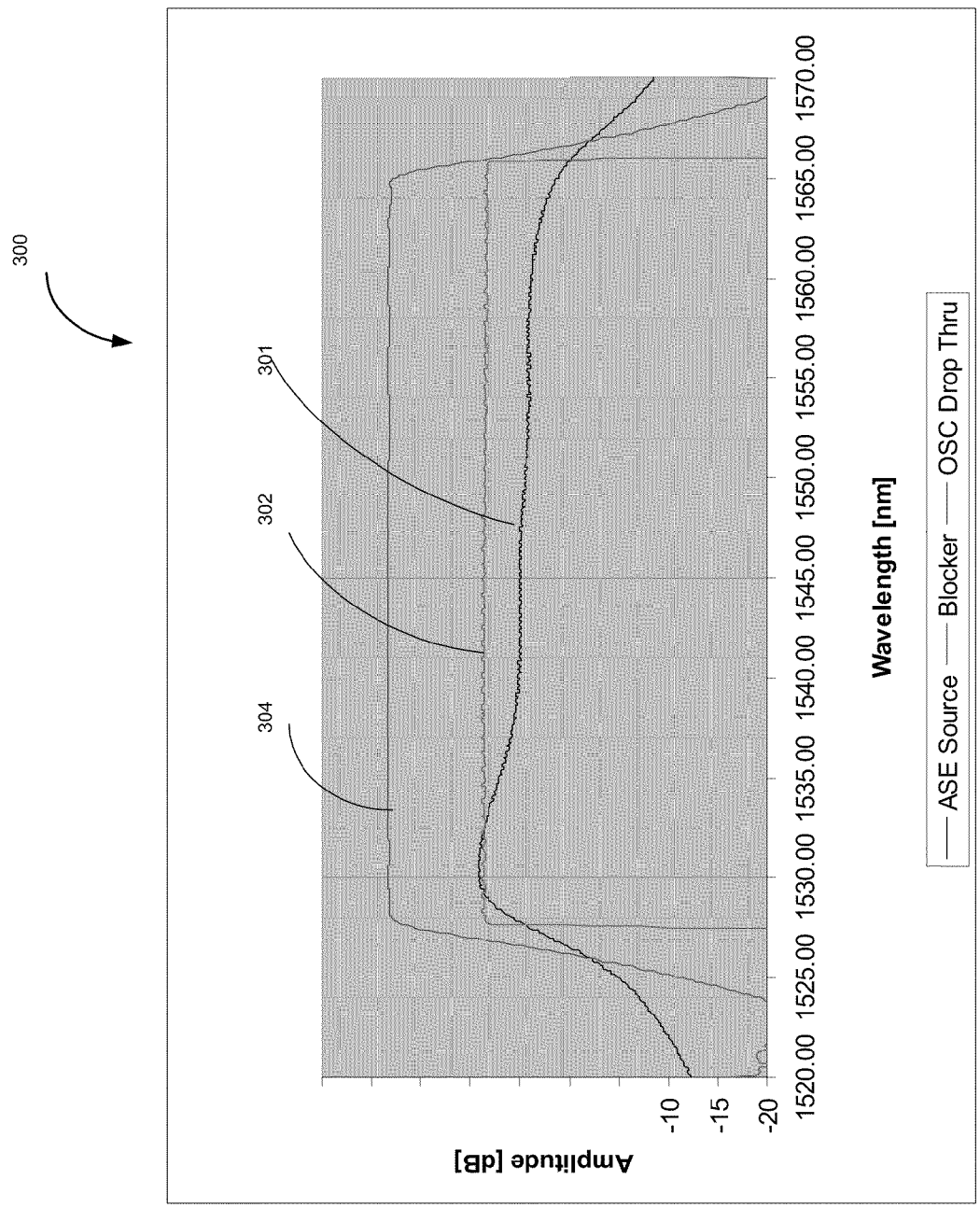
FIG. 3 presents a Spectral Filtering Error and a mechanism for its correction.

The Spectral Filtering Error and the mechanism for its correction are explained with the help of FIG. 3 (300). Example spectral profiles of the ASE source 301, the blocker 302 and an Optical Supervisory Channel (OSC) 304 are displayed in this figure. Note that the wavelength range corresponding to the blocker or the OSC does not overlap entirely with that of the ASE device. Thus making measurements using the output of the ASE source in place of a client signal introduces an error called the Spectral Filtering Error. This error corresponding to the blocker, for example, is a function of the ASE noise spectrum and relative blocker and C-band filter bandwidth. The Spectral Filtering Error correction for the blocker is achieved in the current invention by computing the area in the region not included in the spectral profile corresponding to the blocker but included in the spectral profile for the ASE source, and taking it out during loss computations. The Spectral Filtering Error correction for the OSC can be performed in a similar way.

The Spectral Filtering Error correction can be achieved for any passive optical device in the path between the ASE source and the measurement point. In the most general sense the correction to be applied can be calculated from the optical pass band spectrum at the calculation point by comparing it with the spectrum of the ASE source. Thus the upgrade and commissioning procedures can be updated for other network architectures, a mesh architecture for example, in which the output of a node is connected to the inputs of multiple nodes.

The optical ring network is composed of segments each of which includes two adjacent nodes. Segment 1 includes Node 1 and Node 2 whereas Segment N includes Node N and Node 1. Any intermediate Segment i includes Node i and Node i+1. The network is commissioned segment by segment. The commissioning of a segment is concerned with the commissioning of the nodes in that segment. The method for network commissioning provided by this invention is explained with the flowchart 400 presented in FIG. 4. Upon start (box 402) the procedure verifies the installation of the nodes in the optical ring network (box 404). The procedure then prepares for node commissioning (box 406). Segment 1 is commissioned first (box 407). In order to commission the remaining N−1 segments, a loop counter variable i is set to 2 (box 408). Segment i is commissioned next (box 410). To move its focus to the next node, the procedure increments the loop counter variable i by 1 (box 412) and checks the value of i (box 414). If i is equal to N the procedure exits 'Yes' from box 414 and commissions Segment N (box 416). The procedure checks the commissioning of the nodes (box 418) and exits (box 420). If the value of i checked in box 414 is less than N the procedure exits 'No' from box 414 and loops back to the entry of box 410.

The step of verifying the installation (box 404 in FIG. 4) requires the verification of installation at each node. The verification of installation at each node is explained further with the flowchart 500 presented in FIG. 5. Upon start the procedure sets the ingress amplifier of the node to a constant power mode (box 504) such that it behaves as an ASE source. The blocker is set to pass all channels (box 506). The procedure measures the DC losses between the cards (box 508) and compares these losses with the expected losses (box 510) provided by the Link Planning Tool (LPT). The blocker is then set to pass one channel at a time (box 512) and the effectiveness of per channel control is verified (box 514). Once the verification is complete the procedure exits (box 516). Departure of the measured characteristics from the expected values may lead to the replacement of the appropriate components.

Figure 4:
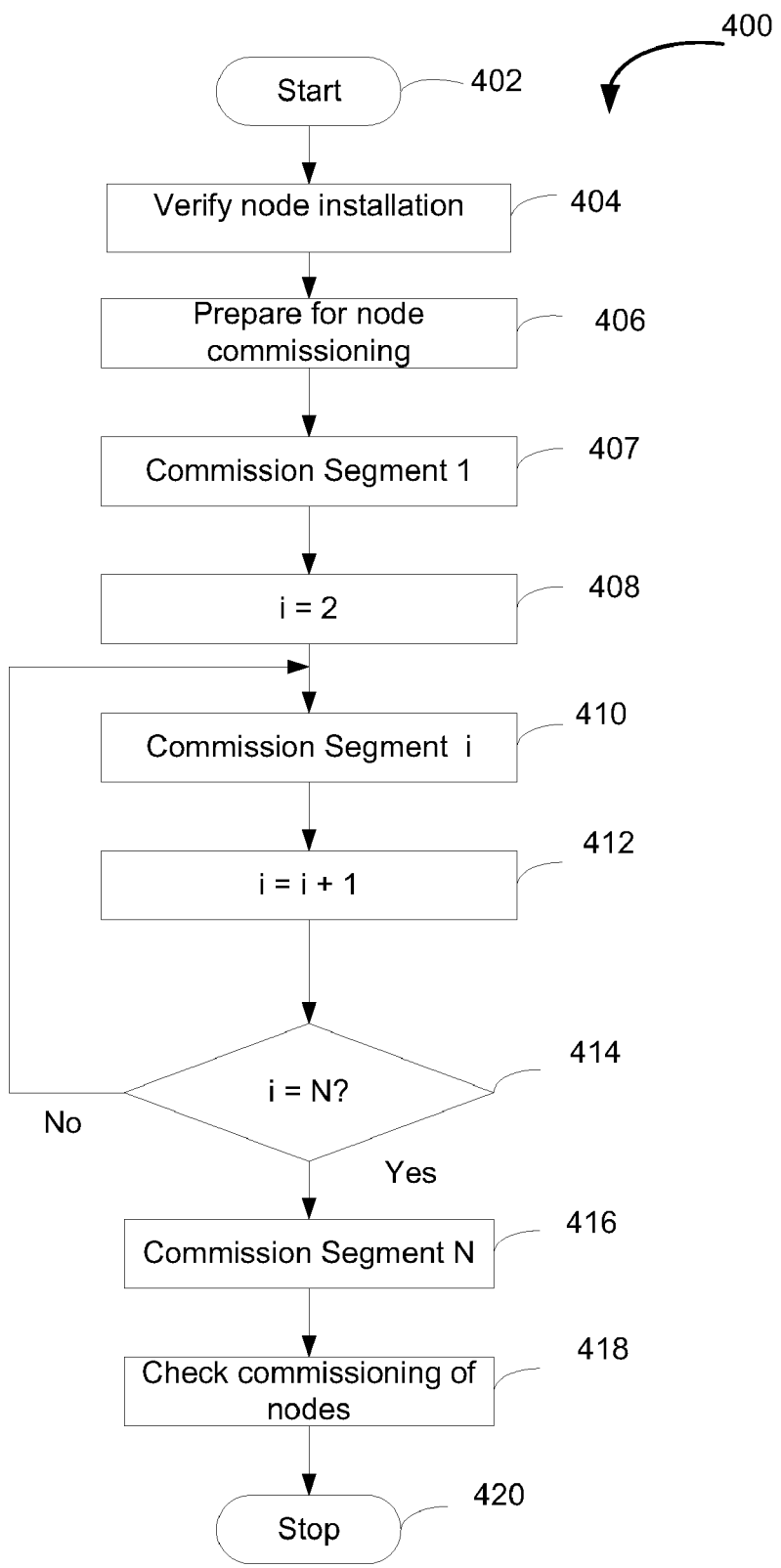
FIG. 4 presents the steps of the method for commissioning the optical network of FIG. 1.
Figure 5:
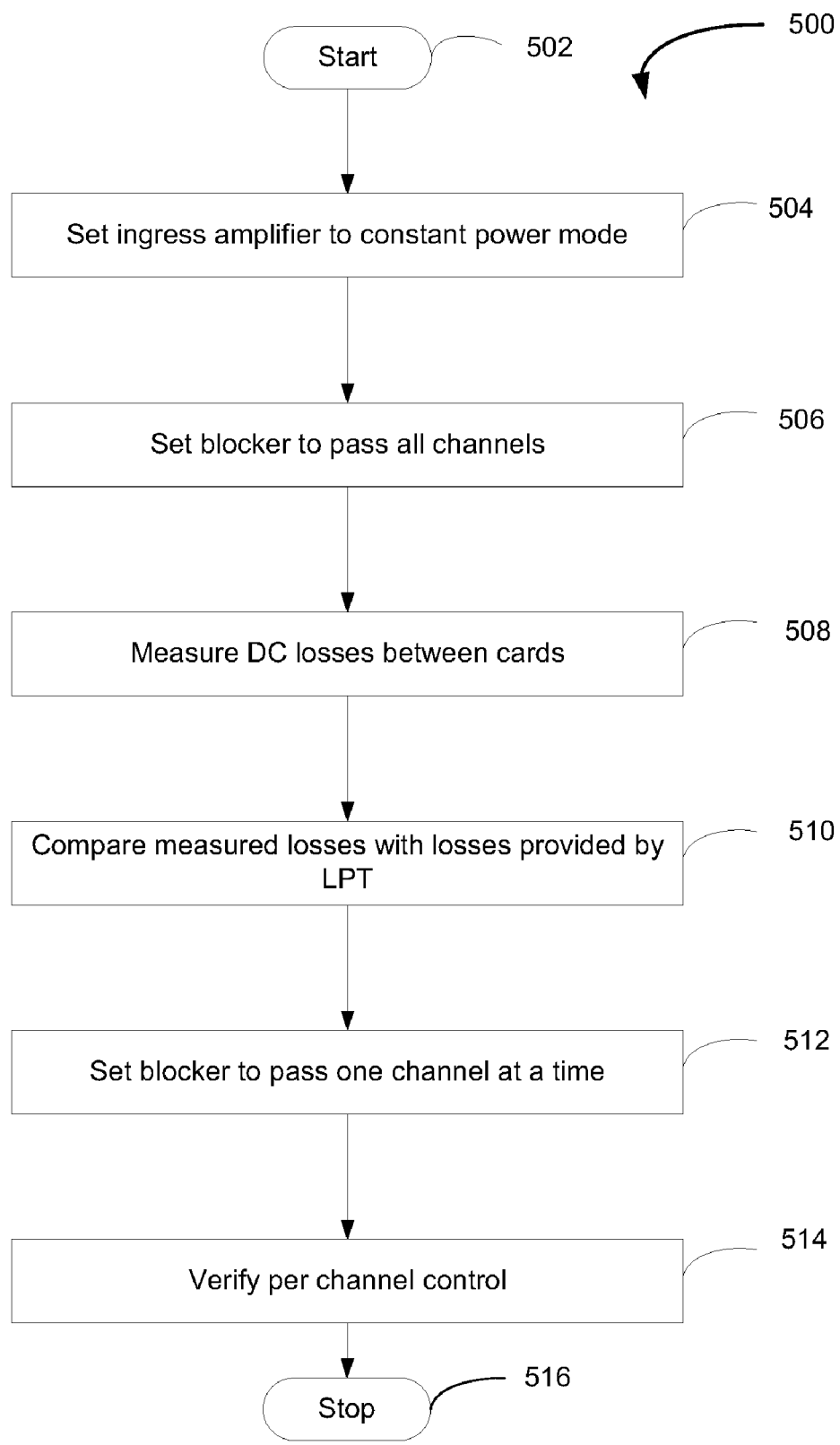
FIG. 5 presents a flowchart for explaining step 404 in FIG. 4.
Figure 6:
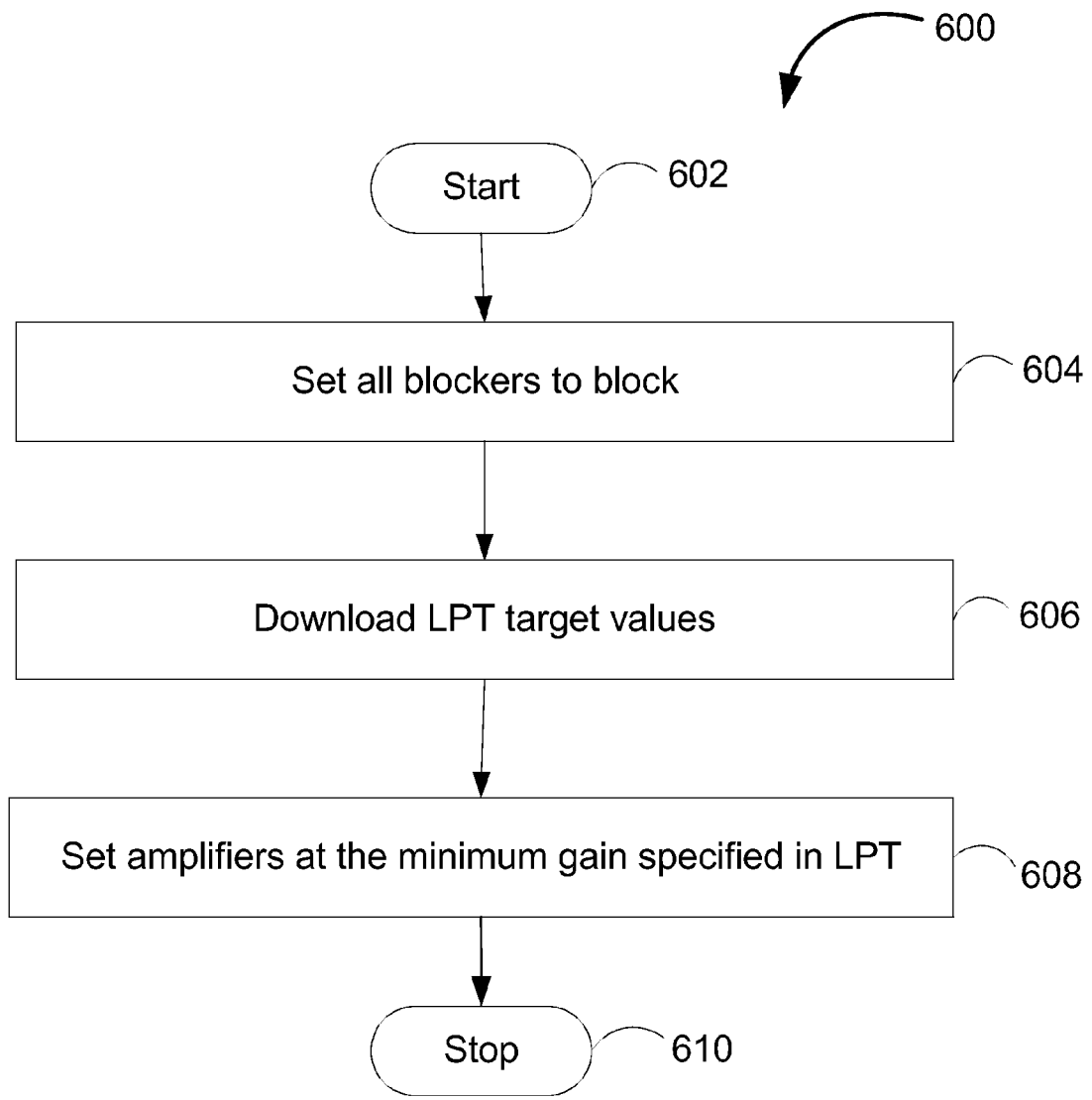
FIG. 6 presents a flowchart for explaining step 406 in FIG. 4.

The step of preparing for node commissioning (box 406) of FIG. 4 is explained further with the flowchart 600 presented in FIG. 6. Upon start the procedure sets all the blockers in all the nodes to block (box 604). The target values to be set for the various characteristics of the components are then downloaded from the LPT to the Network Elements via the Element Management System (box 606). The LPT provides a range for each amplifier gain. As an initialization step, the procedure sets the gain of each amplifier at the minimum value of the range (box 610) and exits (box 610).

Figure 7:
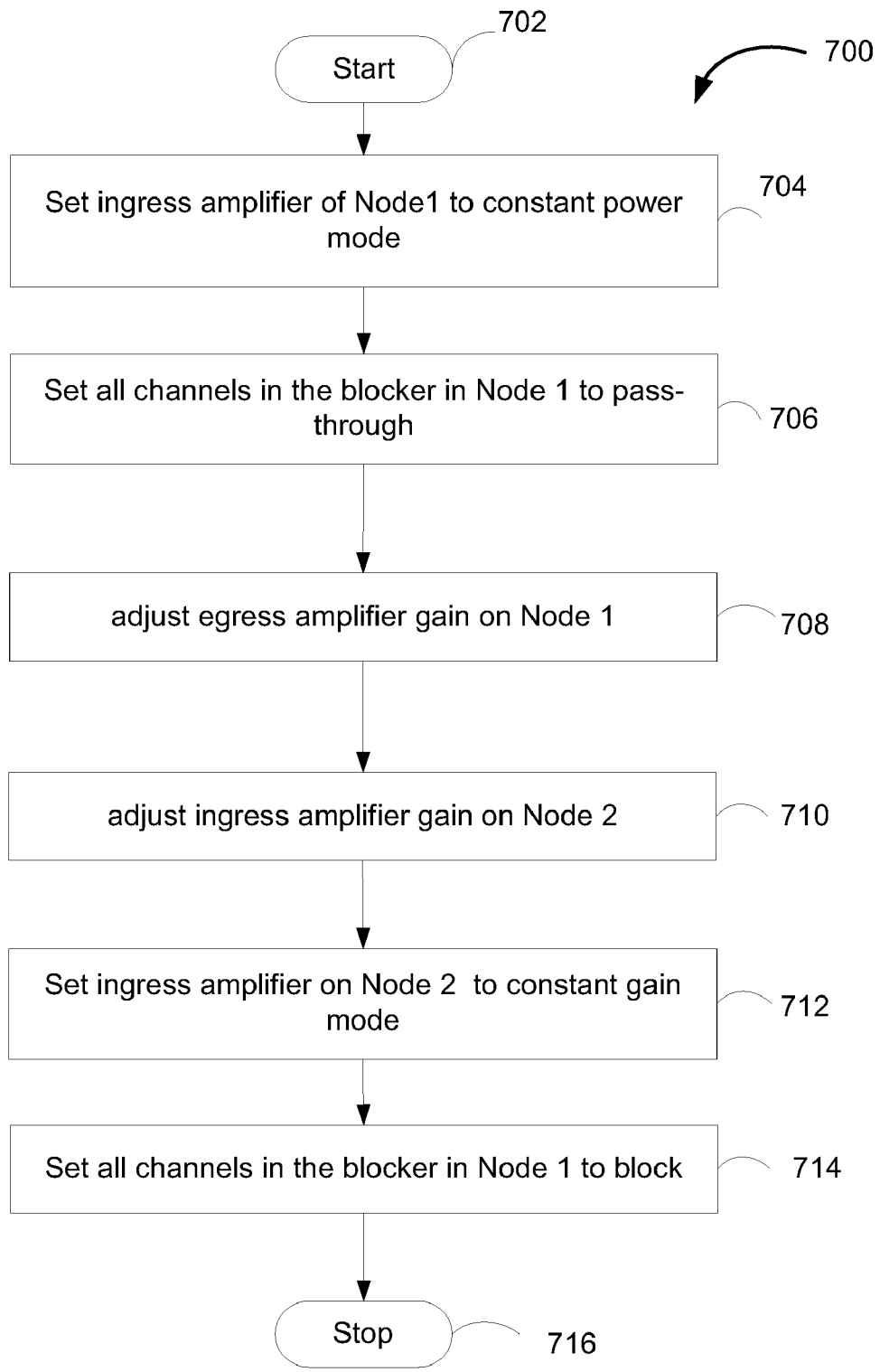
FIG. 7 presents a flowchart for explaining step 407 in FIG. 4.

As shown in FIG. 4, Segment 1 to Segment N in the optical ring network are commissioned next. The commissioning of Segment 1 (box 407 in FIG. 4) is explained with the help of the flowchart 700 in FIG. 7. Upon start (box 702) the procedure sets the ingress amplifier of Node 1 to the constant power mode (box 704) such that it behaves as an ASE source. All the channels in the blocker in the node are then set to pass-through (box 706) such that none of the channels is blocked. The procedure then triggers the egress amplifier adjust of Node 1 using DC powers. The gain of this egress amplifier is thus adjusted (box 708). The ingress amplifier adjust of Node 2 is triggered next for adjusting the gain of this ingress amplifier (box 710). The triggering of the amplifier adjust requires the measurement of the associated losses and the setting of the gain of the appropriate amplifier to a value that compensates for these losses. The techniques for correcting the OSNR induced error as well as the Spectral Filtering error are used by the procedure during the loss computations. The ingress amplifier of Node 1 is set to the constant gain mode (box 712). The procedure then sets all channels in the blocker in Node 1 to block (box 714) and exits (box 716). Note that the gain of the ingress amplifier is set during the commissioning of Segment N.

Figure 8:
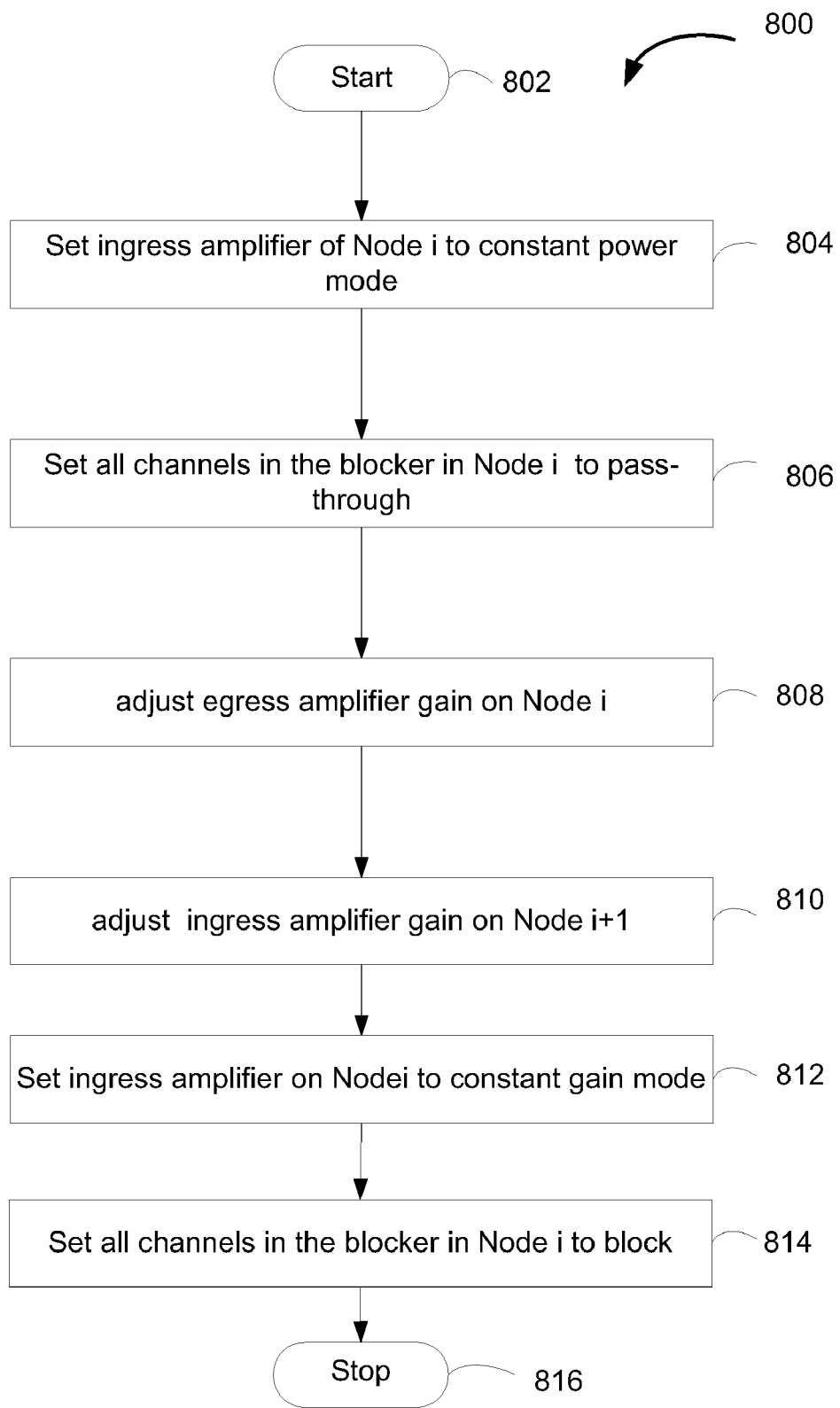
FIG. 8 presents a flowchart for explaining step 410 in FIG. 4.

The step of commissioning of any Segment i ($2 \leq i < N$) in the network (box 410 of FIG. 4) is explained with the help of flowchart 800 presented in FIG. 8. The gain of the ingress amplifier in Node 1 was already set during the commissioning of Segment i−1. Upon start (box 802) the procedure sets the ingress amplifier of Node i to the constant power mode (box 804) such that it behaves as an ASE source. All the channels in the blocker in the node are then set to pass-through (box 806) such that none of the channels is blocked. The procedure then triggers the egress amplifier adjust of Node i by using DC powers. The gain of this egress amplifier is thus adjusted (box 808). The ingress amplifier adjust is triggered on Node i+1 next for adjusting the gain of this ingress amplifier (box 810). As discussed in the previous paragraph, the triggering of the amplifier adjust step requires the measurement of the associated losses and the setting of the gain of the appropriate amplifier to a value that compensates for these losses. The techniques for correcting the OSNR induced error as well as the Spectral Filtering error are used by the procedure during the loss computations. Since the commissioning of Node i is completed its ingress amplifier is set to the constant gain mode (box 812). The procedure sets all channels in the blocker in Node i to block (box 814) and exits (box 816).

Figure 9:
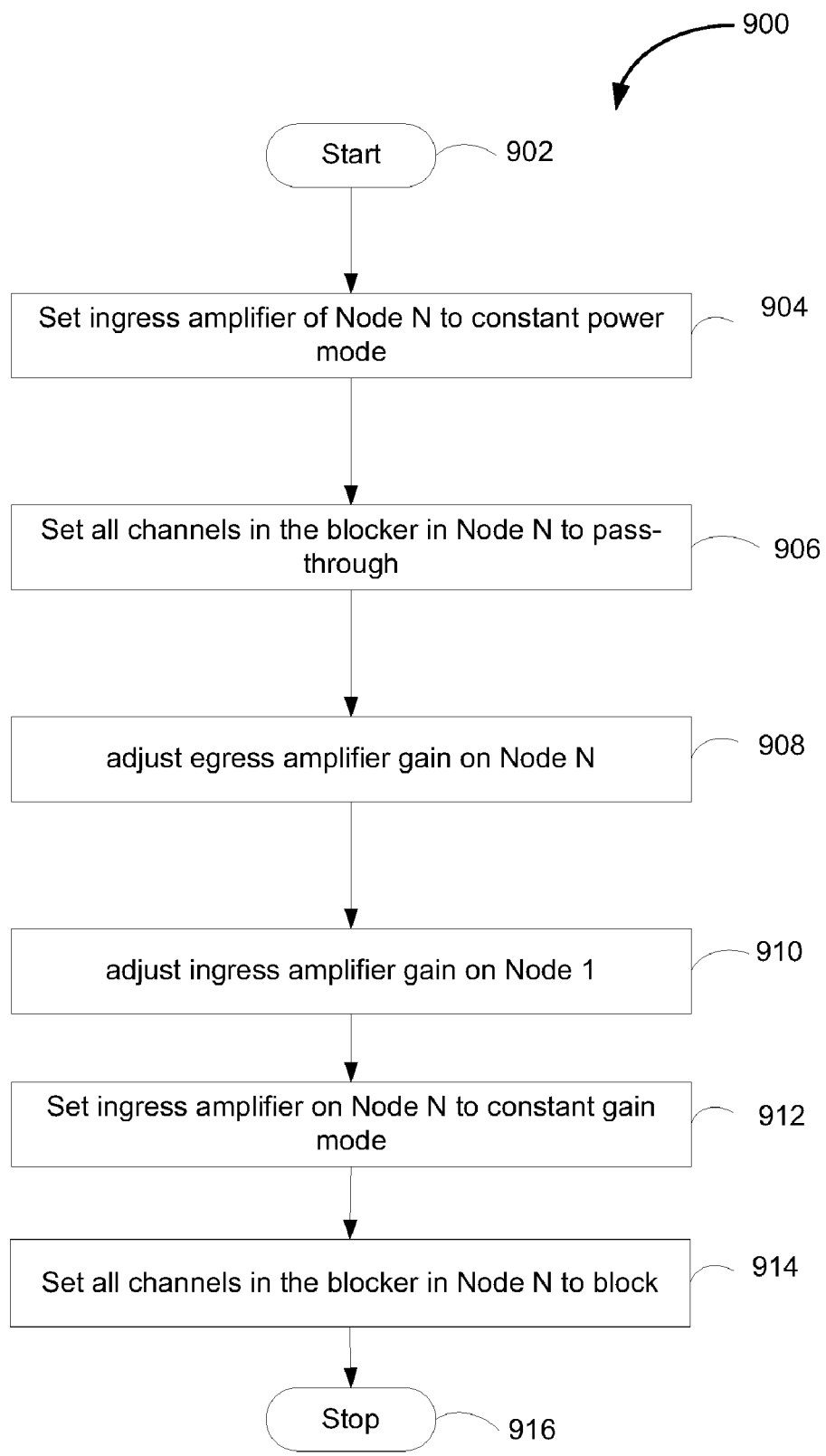
FIG. 9 presents a flowchart for explaining step 416 in FIG. 4.

The step of commissioning of Segment N (box 416 of FIG. 4) is explained with the help of flowchart 900 presented in FIG. 9. Upon start (box 902) the procedure sets the ingress amplifier of Node N to the constant power mode (box 904) so that it becomes an ASE source. All the channels in the blocker in the node are then set to pass-through (box 906) such that none of the channels is blocked. The procedure then triggers the egress amplifier adjust of Node N by using DC powers. The gain of this egress amplifier is thus adjusted (box 908). The ingress amplifier adjust is triggered on Node 1 next for adjusting the gain of this ingress amplifier (box 910). As discussed earlier, the triggering of the amplifier adjust step requires the measurement of the associated losses and the setting of the gain of the appropriate amplifier to a value that compensates for these losses. The techniques for correcting the OSNR induced error as well as the Spectral Filtering error are used by the procedure during the loss computations. The ingress amplifier of Node N is set to the constant gain mode (box 912). The procedure then sets all channels in the blocker in Node N to block (box 914) and exits (box 916).

Figure 10:
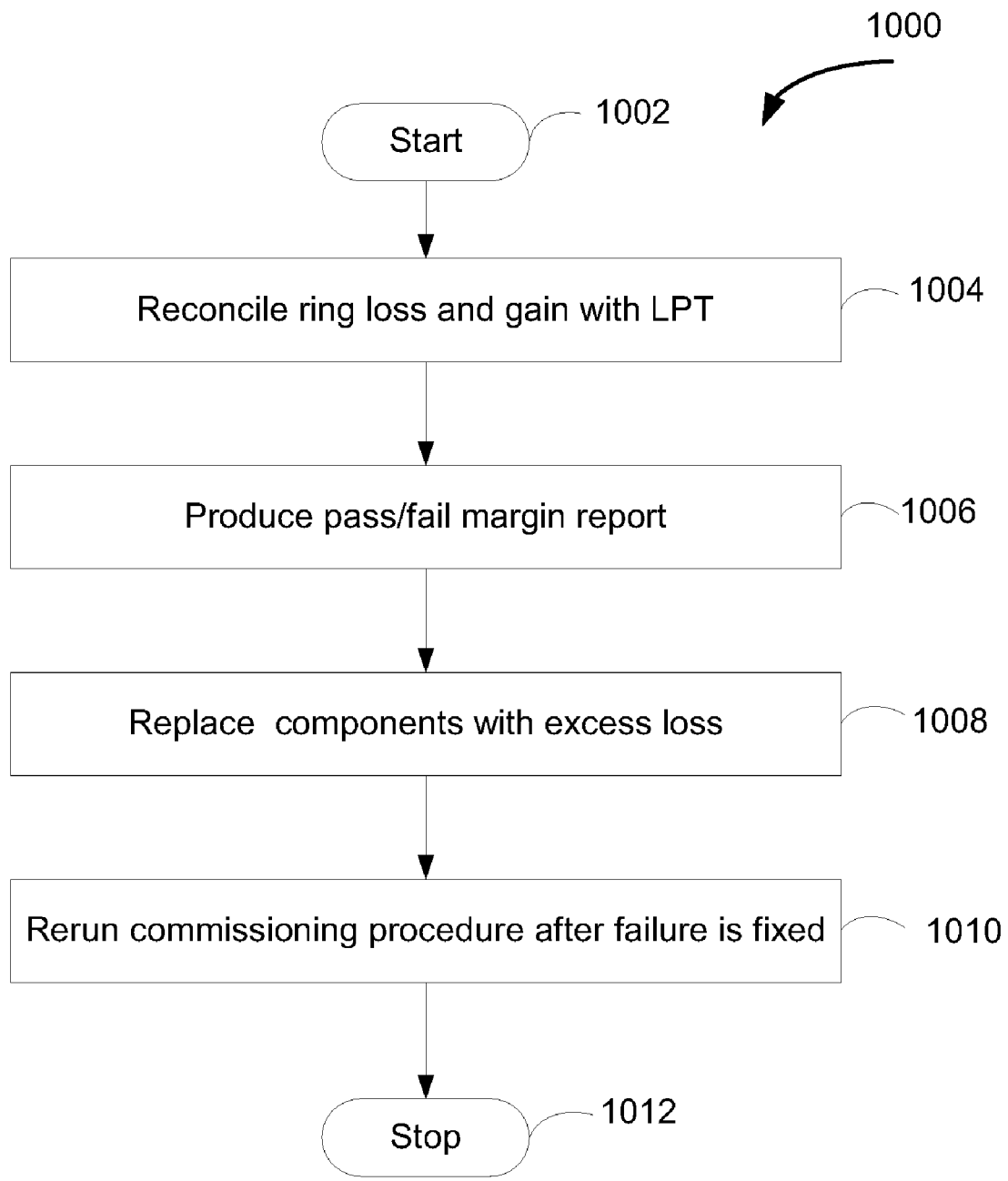
FIG. 10 presents a flowchart for explaining step 418 in FIG. 4.

The step of checking of commissioning of nodes (box 418 of FIG. 4) is explained with the flowchart 1000 shown in FIG. 10. Upon start (box 1002) the procedure reconciles the loss and gain in the entire optical ring network with the LPT (box 1004). It compares the gain/loss produced by each component with the value provided by the LPT. The procedure then produces a pass/fail margin report (box 1006). The report highlights the failed components and how close are their performances to the acceptable worst-case values. The components with excess loss are then replaced (box 1008). The procedure reruns the commissioning procedure for the appropriate segments after a failure is fixed (box 1010) and exits (box 1012).

Upgrading an optical network that includes the addition or deletion of a node as well as making changes in the internal configuration of an existing node through hardware changes is discussed next. A discussion of node addition is presented first followed by a discussion of changing the internal configuration of a node and a discussion of node deletion.

Figure 11:
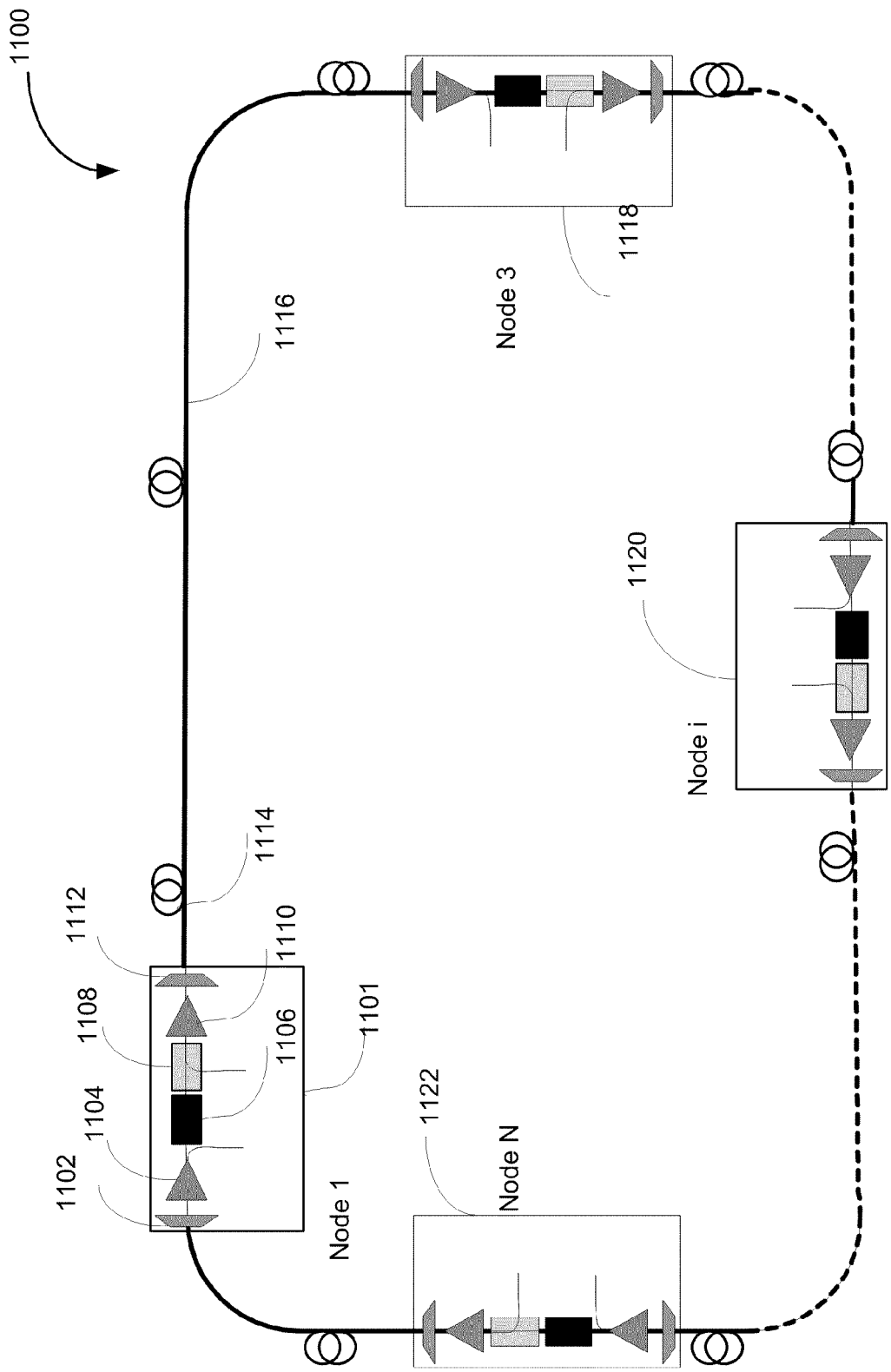
FIG. 11 presents a ring optical network before (after) the addition (deletion) of Node 2.

An example optical ring network 1100 before a node is added between Node 1 and Node 3 is presented in FIG. 11.

The figure displays Node 1, 1101, Node 3 1118, Node i 1120, and Node N 1122 that are organized in the form of a ring. Each node has a number of optical components. Node 1 for example, has a demultiplexer 1102, an ingress amplifier 1104, a blocker 1106, a coupler 1108, an egress amplifier 1110 and a multiplexer 1112. The input for the node arrives at the input of the demultiplexer 1102. The blocker 1106 may be achieved by an appropriately configured Reconfigurable Optical Add Drop Multiplexer (ROADM). The output of the demultiplexer 1102 is connected to the input of the ingress amplifier 1104, the output of which is connected to the input of the blocker 1106. The output of the blocker 1106 is connected to the input of the coupler 1108, the output of which is connected to the input of the egress amplifier 1110. The output of the egress amplifier 1110 is connected to the input of the multiplexer 1112 the output of which is connected to network spans or fibers 1114 and 1116 that carry the output optical signal from Node 1 (1101) to the input of the next node, Node 3 (1118). The output of any Node i ($3 \leq i < N$) 1120 is carried through a network span to the input of Node i+1. In order to maintain a ring configuration, the output of Node N 1122 is presented through a network span to the input of Node 1 1101.

Figure 12:
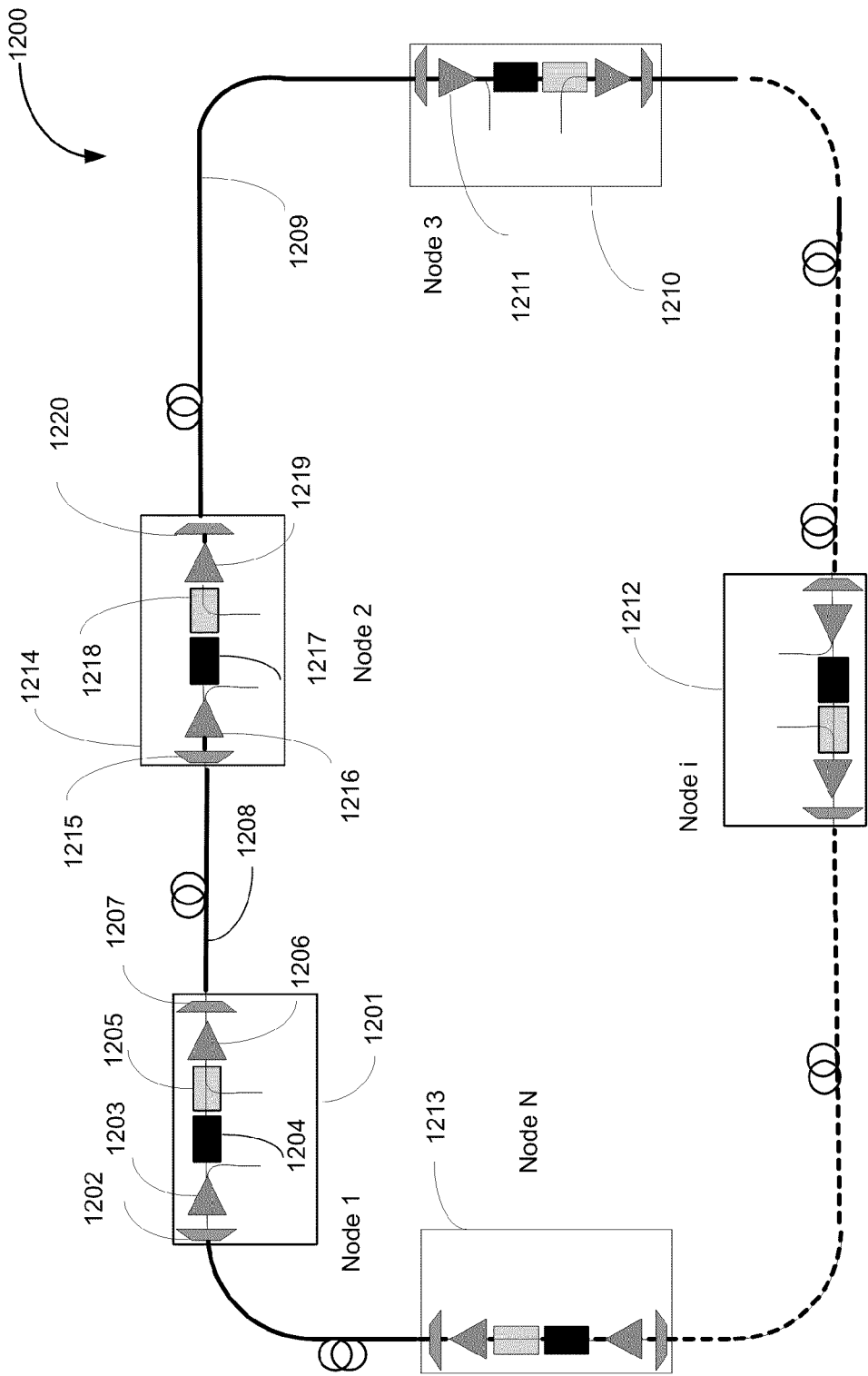
FIG. 12 presents a ring optical network after (before) the addition (deletion) of Node 2.

FIG. 12 shows an optical network 1200 that is achieved after the addition of Node 2 (1214) to the network between Node 1 (1201) and Node 3 (1210). The steps involved in the method of adding Node 2 (1214 in FIG. 12) between Node 1 (1201 in FIG. 12) and Node 3 (1210 in FIG. 12) are explained with the help of the flowchart 1300 presented in FIG. 13. Upon start (box 1301) the hardware for Node 2 is installed (box 1302). The next step is to connect the fiber 1208 and 1209 of FIG. 12 to Node 2 (box 1303). The procedure then proceeds with the commissioning of the affected network segments (box 1304) and exits (box 1305). A similar method can be used when a node is inserted between any two adjacent nodes in the network. Note that when a new node is added, the affected network segments include a preceding segment and a following segment. A preceding segment includes the node immediately preceding the new node in the optical network (Node 1 (1201) in the example of FIG. 12), the new node (Node 2 (1214) in the example of FIG. 12) and the fiber (1208 in the example of FIG. 12) connecting these two nodes. A following segment includes the node immediately following the new node in the optical network (Node 3 (1210) in the example of FIG. 12), the new node and the fiber (1209 in the example of FIG. 12) connecting these two nodes.

Figure 13:
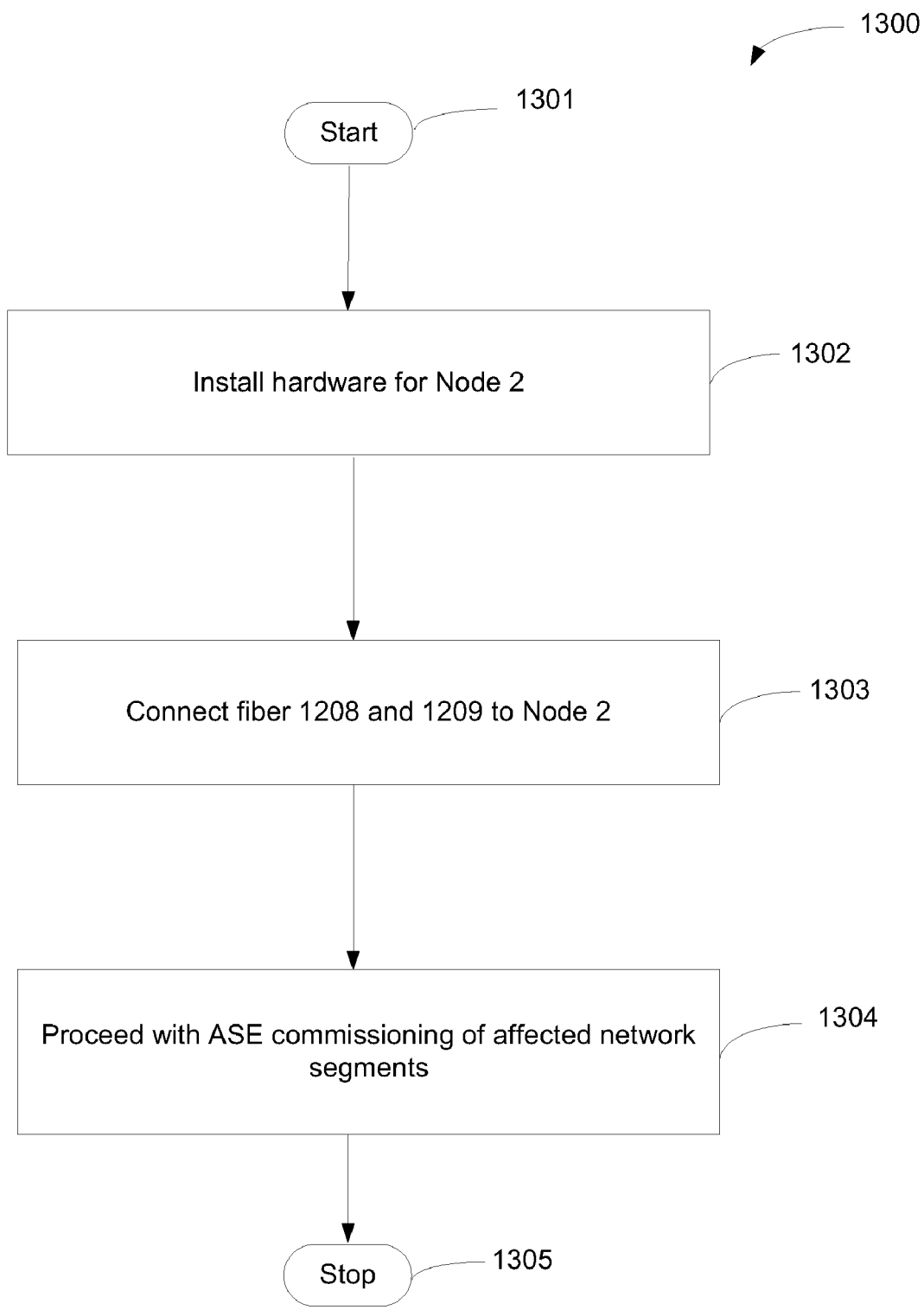
FIG. 13 presents the steps of the method for adding Node 2 in the network of FIG. 11.
Figure 14:
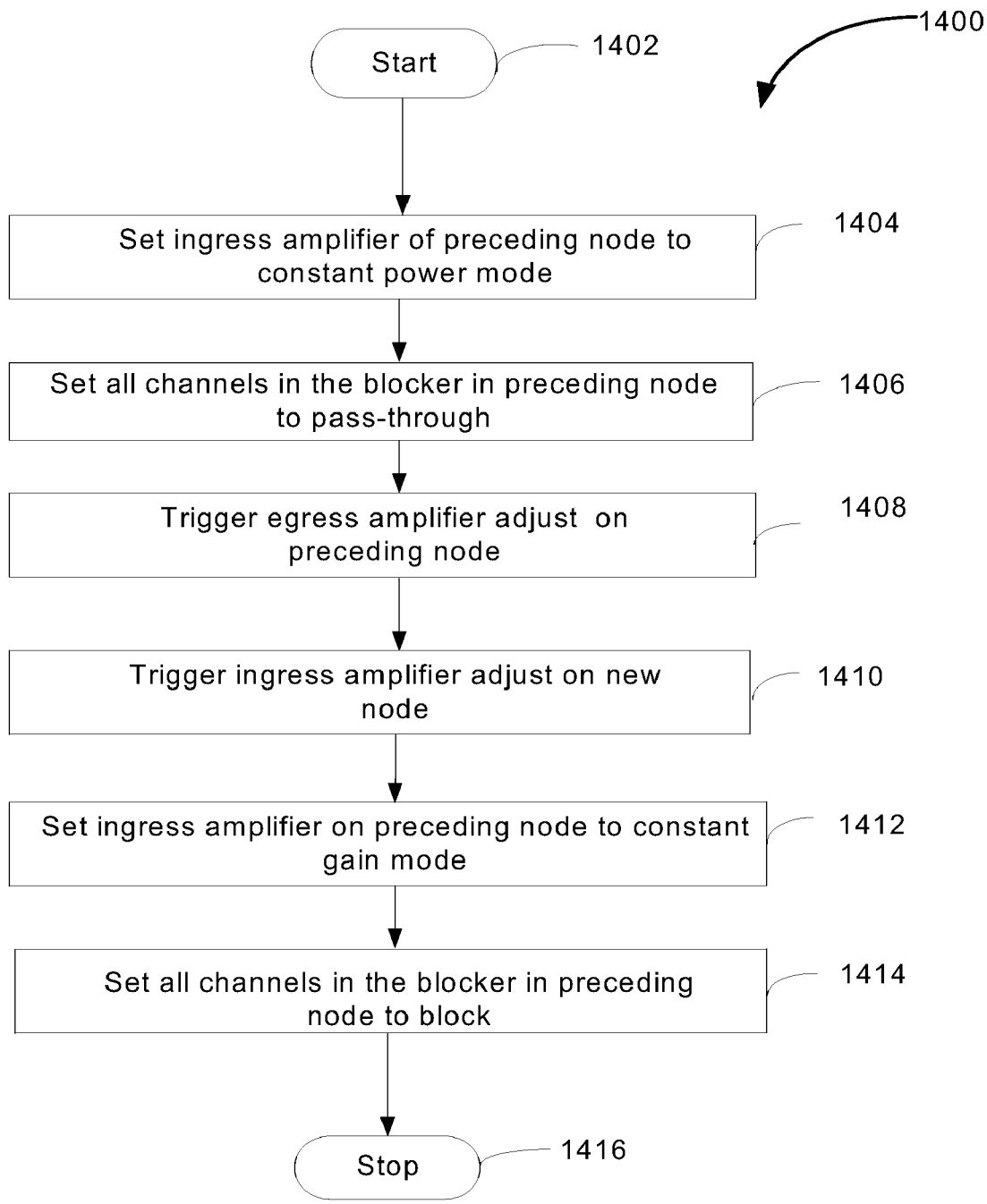
FIG. 14 A presents a flowchart for explaining the step of commissioning the preceding segment after a new node is added.
Figure 14:
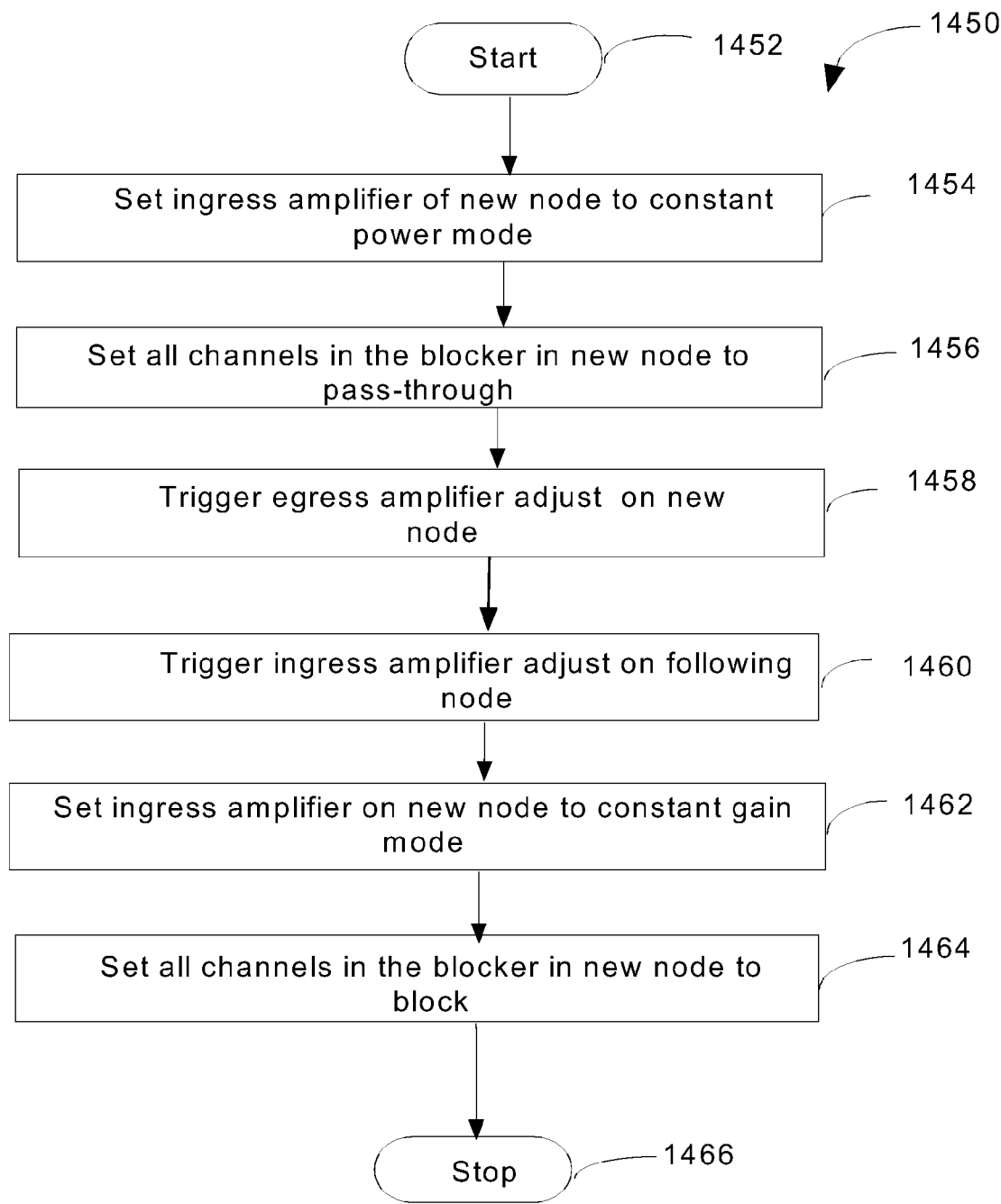

The step of commissioning the affected network segments (box 1304) of FIG. 13 consists of the commissioning of the preceding segment and the following segment that are explained with the help of flowcharts 1400 and 1450 presented in FIG. 14. The commissioning of the preceding segment is explained with the help of flowchart 1400 presented in FIG. 14 A. Upon start (box 1402) the procedure sets the ingress amplifier of the preceding node to the constant power mode (box 1404) such that it behaves as an ASE source. All the channels in the blocker in the node are then set to pass-through (box 1406) such that none of the channels is blocked. The procedure then triggers the egress amplifier adjust of the preceding node by using DC powers. The gain of this egress amplifier is thus adjusted (box 1408). Next, the ingress amplifier adjust is triggered on the new node that is being added for adjusting the gain of this ingress amplifier (box 1410). As discussed earlier, the triggering of the amplifier adjust step requires the measurement of the associated losses and the setting of the gain of the appropriate amplifier to a value that compensates for these losses. The techniques for correcting the OSNR induced error as well as the Spectral Filtering error are used by the procedure during the loss computations. Since the commissioning of the preceding segment is completed, the ingress amplifier of the preceding node is set to the constant gain mode (box 1412). The procedure then sets all channels in the blocker in the preceding node to block (box 1414) and exits (box 1416).

The step of commissioning of the following segment is explained with the help of the flowchart 1450 presented in FIG. 14 B. Upon start (box 1452) the procedure sets the ingress amplifier of the new node to the constant power mode (box 1454) such that it behaves as an ASE source. All the channels in the blocker in the node are then set to pass-through (box 1456) such that none of the channels is blocked. The procedure then triggers the egress amplifier adjust of the new node by using DC powers. The gain of this egress amplifier is thus adjusted (box 1458). Next, the ingress amplifier adjust is triggered on the following node for adjusting the gain of this ingress amplifier (box 1460). As discussed earlier, the triggering of the amplifier adjust step requires the measurement of the associated losses and the setting of the gain of the appropriate amplifier to a value that compensates for these losses. The techniques for correcting the OSNR induced error as well as the Spectral Filtering error are used by the procedure during the loss computations. Since the commissioning of the following segment is completed, the ingress amplifier of the new node is set to the constant gain mode (box 1462). The procedure then sets all channels in the blocker in the new node to block (box 1464) and exits (box 1466).

Figure 15:
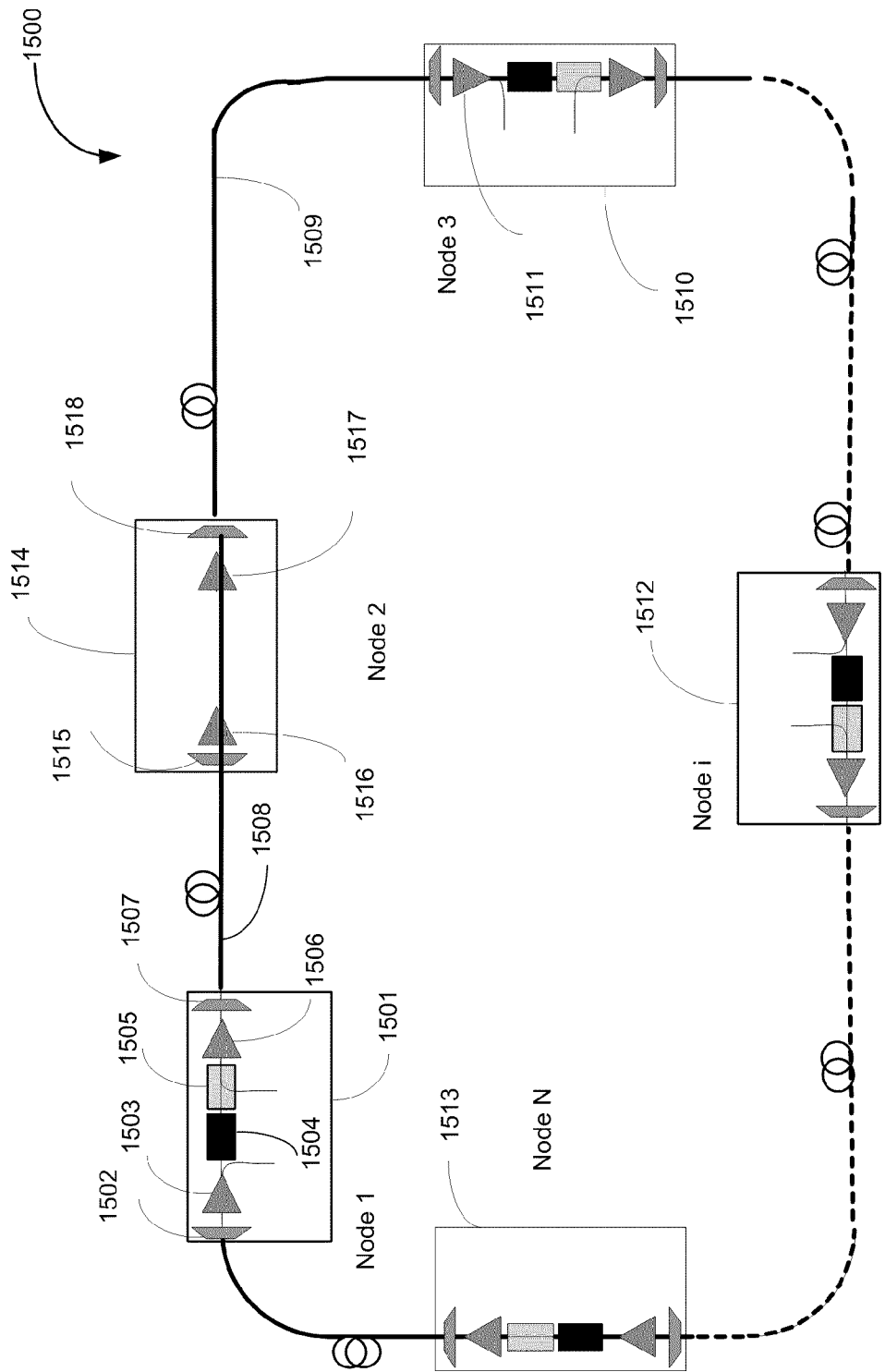
FIG. 15 presents a network before hardware changes were made to Node 2.
Figure 16:
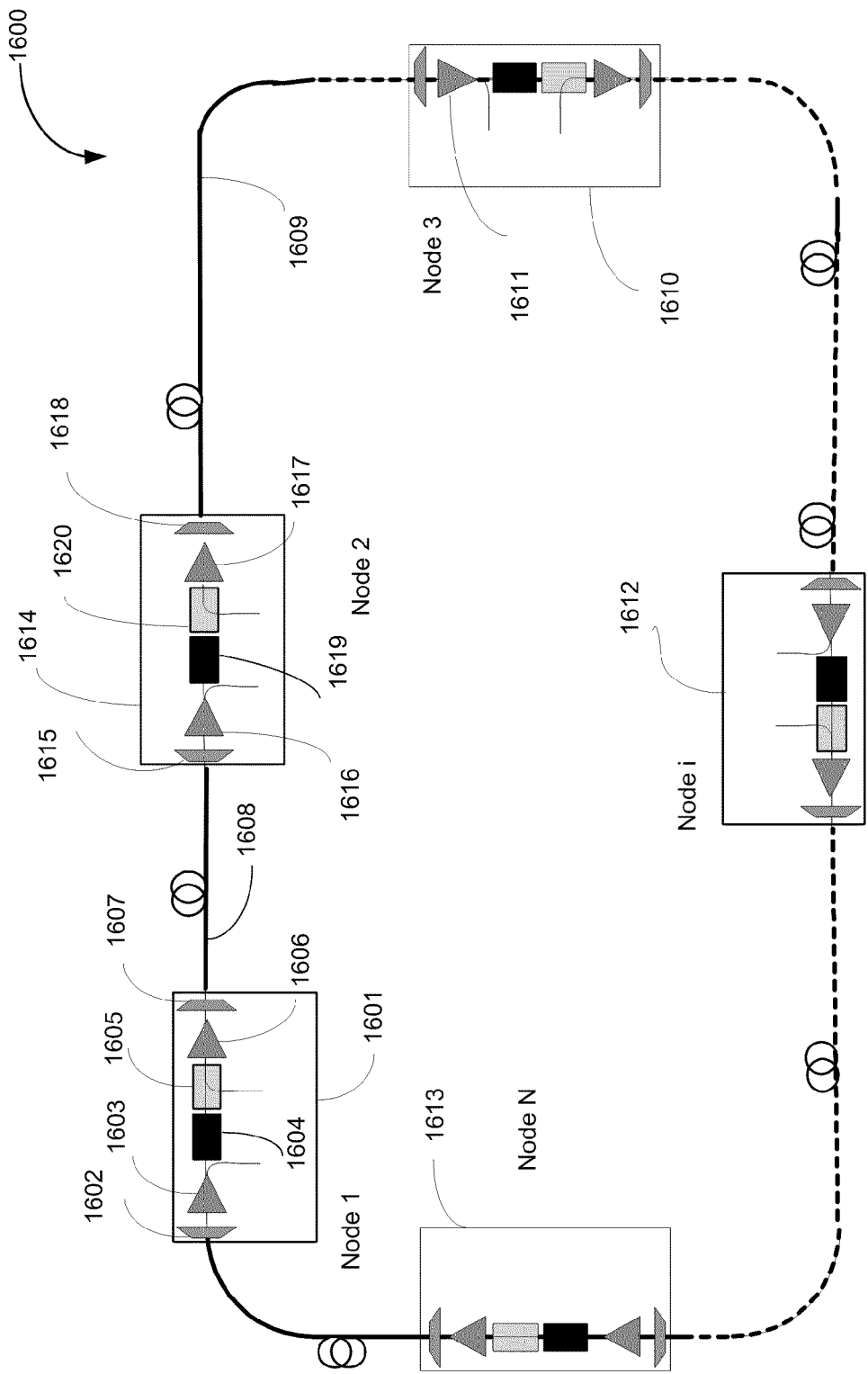
FIG. 16 presents a network after the hardware changes were made to Node 2.
Figure 17:
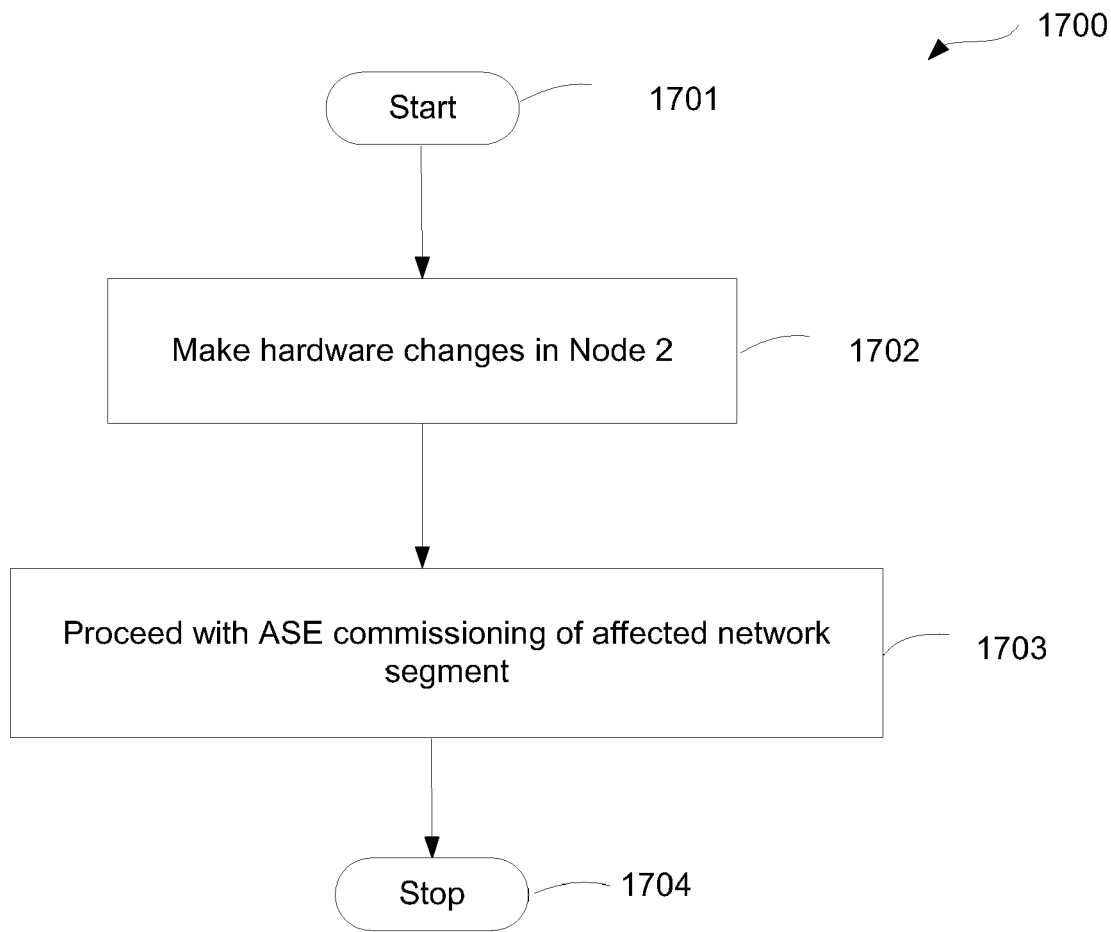
FIG. 17 presents the steps of the method for making hardware changes to Node 2.
Figure 18:
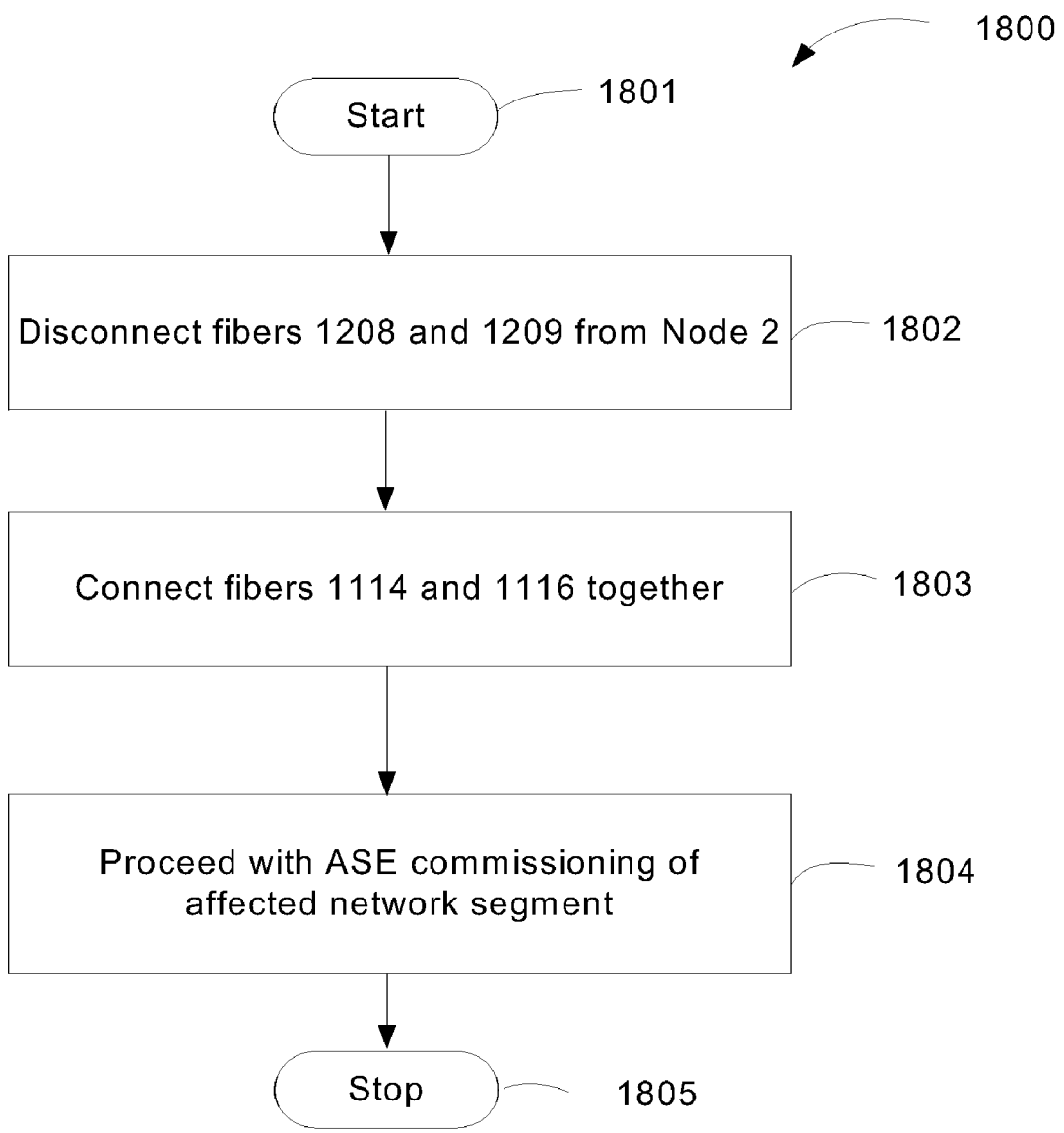
FIG. 18 presents the steps of the method for deleting Node 2 from the network of FIG. 12.

The changing of the internal configuration of a node is discussed next. FIG. 15 shows a network 1500 before the internal configuration of Node 2 (1514) is altered through hardware changes upgrading it from an amplifier only site to a re-configurable optical add-drop site. Before the change, Node 2 (1514) consists of a demultiplexer 1515 the output of which is connected to the input of an ingress amplifier 1516. The output of the ingress amplifier 1516 in turn is connected to the input of the egress amplifier 1517 the output of which is connected to the input of a multiplexer 1518. Note that all the other nodes in 1500 are similar to the nodes described in FIG. 11. The first step in changing the internal configuration is to install the new hardware into Node 2. The network 1600 after the hardware changes were made to Node 2 by incorporating an additional blocker 1619 and an additional coupler 1620 is presented in FIG. 16. The sequence of steps for changing the internal configuration of a node is shown in the flowchart 1700 presented in FIG. 17. Upon start (box 1701) the first step is to make the desired changes in hardware in Node 2 (box 1702). The procedure then performs the commissioning of the affected network segments (box 1703) and exits (box 1704). The affected segments of the network include a preceding segment and a following segment. The preceding segment includes the preceding node (Node 1 (1601) in the example of FIG. 16) immediately preceding the changed node (Node 2 (1614) in the example of FIG. 16) in the optical network, the changed node and the fiber connecting these two nodes (fiber 1608 in the example of FIG. 16). The following segment includes the changed node, the following node (Node 3 (1610) in the example of FIG. 16) and the fiber connecting these two nodes (fiber 1609 in the example of FIG. 16). Procedures similar to The ASE commissioning procedures presented in FIG. 14 A and FIG. 14B are used to commission the affected network segments. The deletion of a node from the network is explained with the help of FIG. 11 and FIG. 12. FIG. 12 shows the network before Node 2 (1214) is deleted and FIG. 11 shows the network after the deletion operation is performed. The method for node deletion is explained with the help of the flowchart 1800 presented in FIG. 18. Upon start (box 1801) the fibers 1208 and 1209 shown in FIG. 12 are disconnected from Node 2 1214 (box 1802). The next step is to connect fiber 1114 and 1116 shown in FIG. 11 together (box 1803). The procedure then performs the ASE commissioning of the affected network segment (box 1804) and exits (box 1805). Note that when a node is deleted, the affected network segment includes the node immediately preceding the deleted node in the optical network (Node 1 (1101) in the example of FIG. 11), the node immediately following the deleted node in the optical network (Node 3 (1118) in the example of FIG. 11), and the joined fibers connecting these two nodes (fibers 1114 and 1116 in the example of FIG. 11).

Figure 19:
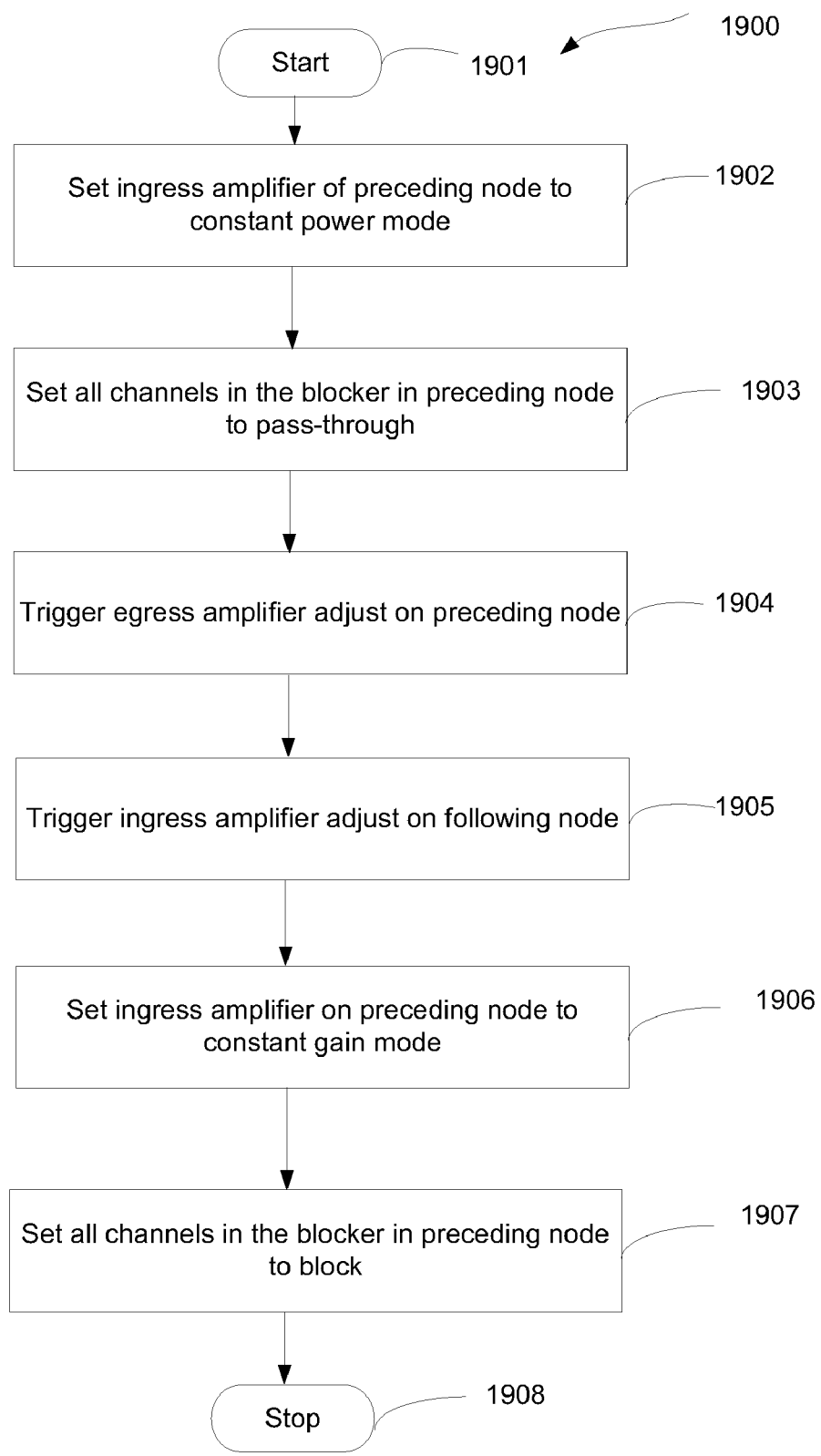
FIG. 19 presents a flowchart for explaining the step of 1804 in FIG. 18.

The step of commissioning the affected network segment (box 1804 of FIG. 18) is explained with the help of the flowchart 1900 presented in FIG. 19. Upon start (box 1901) the procedure sets the ingress amplifier of the preceding node to the constant power mode (box 1902) such that it behaves as an ASE source. All the channels in the blocker in the node are then set to pass-through (box 1903) such that none of the channels is blocked. The procedure then triggers the egress amplifier adjust of the preceding node by using DC powers. The gain of this egress amplifier is thus adjusted (box 1904). The ingress amplifier adjust is triggered on the following node next for adjusting the gain of this ingress amplifier (box 1905). As discussed earlier, the triggering of the amplifier adjust step requires the measurement of the associated losses and the setting of the gain of the appropriate amplifier to a value that compensates for these losses. The techniques for correcting the OSNR induced error as well as the Spectral Filtering error are used by the procedure during the loss computations. Since the commissioning of the affected segment is completed the ingress amplifier of the preceding node is set to the constant gain mode (box 1906). The procedure then sets all the channels in the blocker in the preceding node to block (box 1907) and exits (box 1908).

The method has the following advantages over the existing methods used in prior art, namely:

It provides spectral ripple centering;
It does not require any external source such as laser sources or additional measurement equipment, which leads to a lower cost and avoids the management of extra equipment;
It gives rise to a faster commissioning time, typically, it gives rise to an order of magnitude reduction in commissioning time in comparison to the manual laser-based prior methods;
It provides loss verification to be performed on a node by node basis;
It provides a modular segmented approach to network commissioning; and
It provides the flexibility of upgrading the network or changing the internal configuration of any given node of the network after it has been commissioned.

Note that in the discussion presented the network is shown as unidirectional; in practice the network would be bidirectional and the procedures used in the method of the embodiment run in both directions across the affected span. Although the embodiment of the invention has been described with regard to an optical network with a ring architecture, it is contemplated that a similar method with minor variations can be applied to optical networks with other architectures, e.g., mesh networks.

Numerous modifications and variations of the present invention are possible in light of the above teachings. For example, the commissioning method can be made fault tolerant by skipping over segments of the network with faulty components and commissioning the skipped over segments after the faulty components are replaced. It is therefore to be understood that within the scope of the appended claims, the invention may be practiced otherwise than as specifically described herein.

We claim:

1. A method for managing an optical network including nodes, comprising:
   commissioning the optical network, comprising:
      verifying a node installation, including measuring losses inside the node by using an internal Amplified Spontaneous Emission (ASE) light source inherently present in the optical network, and comparing measured losses with losses provided by the network specifications;
      preparing for node commissioning, including obtaining target values from the network specifications;
      commissioning nodes, including measuring losses inside and between the nodes by using the internal ASE light source; and
      checking commissioning of the nodes, including reconciling loss and gain of the optical network with the network specifications.

2. The method as claimed in claim 1, the optical network including segments, each segment including two adjacent nodes in said optical network.

3. The method as claimed in claim 1, the optical network being a ring optical network.

4. The method as claimed in claim 2, each node including a demultiplexer, an ingress amplifier, an egress amplifier, a blocker, a coupler and a multiplexer.

5. The method as claimed in claim 4, further comprising upgrading the optical network comprises one or more of the following:
   adding a new node;
   deleting a node; and
   changing an internal configuration of a node.

6. The method as claimed in claim 5, the adding the new node further comprising:
   installing hardware for the new node;
   connecting fiber between the new node and a preceding node;
   connecting fiber between the new node and a following node; and
   commissioning affected network segments;
wherein the preceding node is the node that immediately precedes the new node, the following node is the node that immediately follows the new node in the optical network and the affected network segments are segments associated with the new node requiring commissioning.

7. The method as claimed in claim 6, the commissioning the affected network segments further comprising:
   commissioning a preceding segment; and
   commissioning a following segment;
wherein the preceding segment includes the new node, the preceding node and the fiber connecting the preceding node with the new node and the following segment includes the new node, the following node and the fiber connecting the new node with the following node.

8. The method as claimed in claim 7, the commissioning the preceding segment further comprising:
   setting the ingress amplifier of the preceding node to constant power mode for making the ingress amplifier the ASE light source;
   setting all channels in the blocker in the preceding node to pass-through;

adjusting gain of the egress amplifier on the preceding node;

adjusting gain of the ingress amplifier on the new node;

setting the ingress amplifier on the preceding node to constant gain mode; and setting all channels in the blocker in the preceding node to block.

9. The method as claimed in claim 7, the commissioning the following segment further comprising:

setting the ingress amplifier of the new node to constant power mode for making the said ingress amplifier the ASE light source;

setting all channels in the blocker in the new node to pass-through;

adjusting gain of the egress amplifier on the new node;

adjusting gain of the ingress amplifier on the following node;

setting the ingress amplifier on the new node to constant gain mode; and setting all channels in the blocker in the new node to block.

10. The method as claimed in claim 8, the adjusting the gain of the egress amplifier on the preceding node further comprising measuring associated losses and setting the gain of the egress amplifier on the preceding node to a value that compensates for these losses.

11. The method as claimed in claim 8, the adjusting the gain of the ingress amplifier on the new node further comprising measuring associated losses and setting the gain of the ingress amplifier on the new node to a value that compensates for these losses.

12. The method as claimed in claim 10, the measuring associated losses and setting the gain of the egress amplifier on the preceding node further comprising correcting the OSNR induced error as well as the Spectral Filtering error.

13. The method as claimed in claim 11, the measuring associated losses and setting the gain of the ingress amplifier on the new node further comprising correcting the OSNR induced error as well as the Spectral Filtering error.

14. The method as claimed in claim 9, the step of adjusting the gain of the egress amplifier on the new node further comprising the step of measuring associated losses and setting the gain of the egress amplifier on the new node to a value that compensates for these losses.

15. The method as claimed in claim 14, the measuring associated losses and setting the gain of the egress amplifier on the new node further comprising correcting the OSNR induced error as well as the Spectral Filtering error.

16. The method as claimed in claim 9, the adjusting the gain of the ingress amplifier on the following node further comprising measuring associated losses and setting the gain of the ingress amplifier on the following node to a value that compensates for these losses.

17. The method as claimed in claim 16, the measuring associated losses and setting the gain of the ingress amplifier on the following node further comprising correcting the OSNR induced error as well as the Spectral Filtering error.

18. The method as claimed in claim 5, the deleting the node comprising:

disconnecting fiber between a deleted node and a preceding node;

disconnecting fiber between the deleted node and a following node;

connecting fiber between the preceding node and the following node; and commissioning an affected network segment;

wherein the preceding node is the node that immediately precedes the deleted node and the following node is the node that immediately follows the deleted node in the optical network and the affected network segment includes the preceding node, the following node and the fiber connecting the preceding node with the following node.

19. The method as claimed in claim 18, the commissioning the affected network segment further comprising:

setting the ingress amplifier of the preceding node to constant power mode for making the said ingress amplifier the ASE light source;

setting all channels in the blocker in the preceding node to pass-through;

adjusting gain of the egress amplifier on the preceding node;

adjusting gain of the ingress amplifier on the following node;

setting the ingress amplifier on the preceding node to constant gain mode; and setting all channels in the blocker in the preceding node to block.

20. The method as claimed in claim 19, the adjusting the gain of the egress amplifier on the preceding node further comprising measuring associated losses and setting the gain of the egress amplifier on the preceding node to a value that compensates for these losses.

21. The method as claimed in claim 20, the measuring associated losses and setting the gain of the egress amplifier on the preceding node further comprising correcting the OSNR induced error as well as the Spectral Filtering error.

22. The method as claimed in claim 19, the adjusting the gain of the ingress amplifier on the following node further comprising measuring associated losses and setting the gain of the ingress amplifier on the following node to a value that compensates for these losses.

23. The method as claimed in claim 22, the measuring associated losses and setting the gain of the ingress amplifier on the following node further comprising correcting the OSNR induced error as well as the Spectral Filtering error.

24. The method as claimed in claim 5, the changing the internal configuration of a node further comprising:

making hardware changes in a changed node; and commissioning affected network segments;

wherein the affected network segments are segments associated with the changed node requiring commissioning.

25. The method as claimed in claim 24, the commissioning the affected network segments further comprising:

commissioning a preceding segment; and commissioning a following segment;

wherein the preceding segment includes the preceding node that immediately precedes the changed node in the optical network, the changed node and the fiber connecting the preceding node with the changed node and the following segment includes the changed node, a following node that immediately follows the changed node in the optical network and the fiber connecting the changed node with the following node.

26. The method as claimed in claim 25, the commissioning the preceding segment further comprising:

setting the ingress amplifier of the preceding node to constant power mode for making the said ingress amplifier the ASE light source;

setting all channels in the blocker in the preceding node to pass-through;

adjusting gain of the egress amplifier on the preceding node;

adjusting gain of the ingress amplifier on the changed node;

setting the ingress amplifier on the preceding node to constant gain mode; and setting all channels in the blocker in the preceding node to block.

27. The method as claimed in claim 25, the commissioning the following segment further comprising:

setting the ingress amplifier of changed node to constant power mode for making the said ingress amplifier the ASE light source;

setting all channels in the blocker in changed node to pass-through;

adjusting gain of the egress amplifier on the changed node;

adjusting gain of the ingress amplifier on the following node;

setting the ingress amplifier on the changed node to constant gain mode; and setting all channels in the blocker in the changed node to block.

28. The method as claimed in claim 26, the adjusting the gain of the egress amplifier on the preceding node further comprising measuring associated losses and setting the gain of the egress amplifier on the preceding node to a value that compensates for these losses.

29. The method as claimed in claim 28, the measuring associated losses and setting the gain of the egress amplifier on the preceding node further comprising correcting the OSNR induced error as well as the Spectral Filtering error.

30. The method as claimed in claim 26, the adjusting the gain of the ingress amplifier on the changed node further comprising measuring associated losses and setting the gain of the ingress amplifier on the changed node to a value that compensates for these losses.

31. The method as claimed in claim 30, the measuring associated losses and setting the gain of the ingress amplifier on the changed node further comprising correcting the OSNR induced error as well as the Spectral Filtering error.

32. The method as claimed in claim 27, the adjusting the gain of the egress amplifier on the changed node further comprising measuring associated losses and setting the gain of the egress amplifier on the changed node to a value that compensates for these losses.

33. The method as claimed in claim 32, the measuring associated losses and setting the gain of the egress amplifier on the changed node further comprising correcting the OSNR induced error as well as the Spectral Filtering error.

34. The method as claimed in claim 27, the adjusting the gain of the ingress amplifier on the following node further comprising measuring associated losses and setting the gain of the ingress amplifier on the following node to a value that compensates for these losses.

35. The method as claimed in claim 34, the measuring associated losses and setting the gain of the ingress amplifier on the following node further comprising correcting the OSNR induced error as well as the Spectral Filtering error.

* * * * *

UNITED STATES PATENT AND TRADEMARK OFFICE
CERTIFICATE OF CORRECTION

PATENT NO. : 7,652,816 B2  Page 1 of 1
APPLICATION NO. : 11/615953
DATED : January 26, 2010
INVENTOR(S) : De Rocher et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 305 days.

Signed and Sealed this

Twenty-eighth Day of December, 2010

David J. Kappos
*Director of the United States Patent and Trademark Office*